(12) United States Patent
Spurlock et al.

(10) Patent No.: US 11,063,907 B2
(45) Date of Patent: Jul. 13, 2021

(54) DATA PROTECTION AUTOMATIC OPTIMIZATION SYSTEM AND METHOD

(71) Applicant: Cobalt Iron, Inc., Lawrence, KS (US)

(72) Inventors: Richard Raymond Spurlock, Lawrence, KS (US); Robert Merrill Marett, Lawrence, KS (US); James Thomas Kost, Lawrence, KS (US); Gregory John Tevis, Solvang, CA (US)

(73) Assignee: COBALT IRON, INC., Lawrence, KS (US)

( * ) Notice: Subject to any disclaimer, the term of this patent is extended or adjusted under 35 U.S.C. 154(b) by 195 days.

(21) Appl. No.: 16/251,358

(22) Filed: Jan. 18, 2019

(65) Prior Publication Data

US 2020/0236085 A1    Jul. 23, 2020

(51) Int. Cl.
*H04L 29/06* (2006.01)
*H04L 12/801* (2013.01)

(52) U.S. Cl.
CPC .......... *H04L 63/0227* (2013.01); *H04L 47/10* (2013.01); *H04L 63/1441* (2013.01); *H04L 63/166* (2013.01)

(58) Field of Classification Search
CPC . H04L 63/0227; H04L 47/10; H04L 63/1441; H04L 63/166
See application file for complete search history.

(56) References Cited

U.S. PATENT DOCUMENTS

| | | | |
|---|---|---|---|
| 7,197,660 B1* | 3/2007 | Liu | G06F 11/2035 714/4.12 |
| 8,521,883 B1 | 8/2013 | Wartnick et al. | |
| 9,495,338 B1* | 11/2016 | Hollis | G06F 40/14 |
| 10,055,582 B1 | 8/2018 | Weaver et al. | |
| 10,623,429 B1* | 4/2020 | Vines | H04L 41/14 |

(Continued)

FOREIGN PATENT DOCUMENTS

EP    2916301 A1    9/2015

OTHER PUBLICATIONS

Ryu et al., "Controlling Network Bandwidth to Support Storage QoS," Fourth International Workshop on Storage Network Architecture and Parallel I/Os (SNAPI 2007), San Diego, CA, 2007, pp. 60-68 (Year: 2007).*

(Continued)

*Primary Examiner* — Peter G Shaw
*Assistant Examiner* — Zhe Liu
(74) *Attorney, Agent, or Firm* — Polsinelli PC; Kory D. Christensen

(57) ABSTRACT

A system includes a memory and at least one processor to set a network throughput level setting to a default network traffic rate in a computer network, begin a data protection operation at the network throughput level setting in the computer network, continually monitor the computer network and determine that a condition has occurred in the computer network, dynamically adjust the network throughput level setting in response to the condition by one of decreasing the network throughput level setting by a network traffic rate increment and increasing the network throughput level setting by the network traffic rate increment, and dynamically shape network or storage traffic for the data protection operation using the network throughput level setting.

12 Claims, 14 Drawing Sheets

(56) References Cited

U.S. PATENT DOCUMENTS

| | | | |
|---|---|---|---|
| 10,673,880 B1* | 6/2020 | Pratt | G06N 20/00 |
| 10,681,074 B2 | 6/2020 | Crabtree | |
| 2005/0044422 A1 | 2/2005 | Cantrell et al. | |
| 2006/0253902 A1* | 11/2006 | Rabadan | H04L 63/0227 |
| | | | 726/13 |
| 2009/0063708 A1* | 3/2009 | Sultan | H04L 45/00 |
| | | | 709/252 |
| 2014/0355427 A1* | 12/2014 | Cheng | H04L 43/0888 |
| | | | 370/230 |
| 2015/0326481 A1* | 11/2015 | Rector | H04L 12/6418 |
| | | | 370/236 |
| 2015/0334602 A1* | 11/2015 | Hencinski | H04W 28/20 |
| | | | 370/338 |
| 2016/0224377 A1* | 8/2016 | Farhan | G06F 9/505 |
| 2016/0239235 A1 | 8/2016 | Chung | |
| 2016/0335009 A1* | 11/2016 | Vijayan | G06F 11/1469 |
| 2016/0371152 A1 | 12/2016 | Parshin | |
| 2017/0078208 A1* | 3/2017 | Panin | H04L 47/24 |
| 2017/0132056 A1* | 5/2017 | Epstein | H04L 41/145 |
| 2017/0223031 A1 | 8/2017 | Gu et al. | |
| 2017/0235758 A1 | 8/2017 | Gopalapura et al. | |
| 2017/0317953 A1* | 11/2017 | Sareen | H04Q 11/0067 |
| 2018/0107824 A1 | 4/2018 | Gibbons et al. | |
| 2018/0248896 A1 | 8/2018 | Challita et al. | |
| 2019/0028403 A1* | 1/2019 | Moldvai | H04L 67/1097 |
| 2019/0205244 A1 | 7/2019 | Smith | |
| 2019/0386957 A1 | 12/2019 | Leon | |
| 2020/0042608 A1* | 2/2020 | Gahlot | G06F 16/182 |

OTHER PUBLICATIONS

C. Oliveira, Jaime Bae Kim and T. Suda, "An adaptive bandwidth reservation scheme for high-speed multimedia wireless networks," in IEEE Journal on Selected Areas in Communications, vol. 16, No. 6, pp. 858-874, Aug. 1998 (Year: 1998).*

Extended European Search Report, Application No. 19164160.4, dated Sep. 20, 2019, 8 pages.

Extended European Search Report, Application No. 19164159.6, dated Sep. 18, 2019, 7 pages.

Extended European Search Report, Application No. 19164157.0, dated Sep. 17, 2019, 8 pages.

Extended European Search Report, Application No. 19164161.2, dated Oct. 23, 2019, 8 pages.

Final Office Action, U.S. Appl. No. 16/251,339, dated Sep. 24, 2020, 11 pages.

Non-Final Office Action, U.S. Appl. No. 16/251,339, dated Jul. 20, 2020, 9 pages.

Notice of Allowance, U.S. Appl. No. 16/251,339, dated Mar. 2, 2021, 6 pages.

Lin et al., "A Survey on Network Security-Related Data Collection Technologies," in IEEE Access, vol. 6, pp. 18345-18365, 2018, doi: 10.1109/ACCESS.2018.2817921.

* cited by examiner

```
dataCustodyPolicy                                Data Custody Policy
    dataCustodyRoleGDPR          // subject, controller, processor, or DPO
    businessProjectName          // project data is associated with
    businessProjectPriority      // priority level of project
    dataRetentionRequirements    // data retention period or service level
                                 // containing retention period
    dataEncryptionLevel          // encryption requirements for data
    dataAccessControls           // security access roles
    dataResiliencyLevel          // number copies, multi-site copies required, etc
    dataLocalityAllowed          // where data is allowed—within region, etc
    networkThroughputLevel       // normal network utilization level allowed
    networkTrafficRate           // a specific network traffic rate for a condition or event
    networkTrafficRateIncrement  // a specific network traffic increment to use for a condition
                                 // or event
```

FIG. 7

DATA PROTECTION AUTOMATIC OPTIMIZATION SYSTEM AND METHOD

BACKGROUND

Protection of data in a modern computing network is an amazingly complex and costly endeavor. Massive data growth limits the abilities of hardware and software technologies and also puzzles well-trained data professionals. New workloads including workloads in a cloud-based computer network bring new data management complexities. Cyber-criminal activities may threaten the availability and integrity of critical business data. In addition, the demands of application owners and data owners may be at odds with the demands of regulatory requirements. The desire to leverage various emerging technologies and cloud capabilities may even further complicate data protection computing architectures. Enterprise financial pressures may leave insufficient funds available to effectively protect increasingly large and complex corporate networks and their associated data. These and other issues present some of the most complex and costly information technology challenges facing businesses today.

It is with these issues in mind, among others, that various aspects of the disclosure were conceived.

SUMMARY

According to one aspect, a data protection automatic optimization system and method is provided for automating operations associated with data protection. As an example, the automation may include an automatic dynamic adjustment to data collection activities in response to a detected event or condition. As another example, the automation may include an automatic dynamic adjustment to data storage in response to a detected attack on a computer network, such as a ransomware attack. As another example, the automation may include dynamic reconfiguration and optimization of data protection infrastructure and operations based on changes in the environment and advancements in best practices. As another example, the automation may include automated data health remediation including correlating and analyzing components and events in a complex multi-domain data protection environment. This may include monitoring symptoms, devices, and events to anticipate a variety of issues and potential problems. As another example, the automation may include optimizing data protection operation sequencing based on data custody discipline. Data protection operations may be prioritized based on a data custody policy, data service levels, business project priorities, and other input. As another example, the automation may include dynamic adjustment or shaping of network or storage traffic throughputs based on current utilization levels, security alert levels, data locality, and/or other conditions or events in the computer network.

A system may include a memory and at least one processor to set a network throughput level setting to a default network traffic rate in a computer network, begin a data protection operation at the network throughput level setting in the computer network, continually monitor the computer network and determine that a condition has occurred in the computer network, dynamically adjust the network throughput level setting in response to the condition by one of decreasing the network throughput level setting by a network traffic rate increment and increasing the network throughput level setting by the network traffic rate increment, and dynamically shape network or storage traffic for the data protection operation using the network throughput level setting.

According to another aspect, a method includes setting, by at least one processor, a network throughput level setting to a default network traffic rate in a computer network, beginning, by the at least one processor, a data protection operation at the network throughput level setting in the computer network, continually monitoring, by the at least one processor, the computer network and determining that a condition has occurred in the computer network, dynamically adjusting, by the at least one processor, the network throughput level setting in response to the condition by one of decreasing the network throughput level setting by a network traffic rate increment and increasing the network throughput level setting by the network traffic rate increment, and dynamically shaping, by the at least one processor, network or storage traffic for the data protection operation using the network throughput level setting.

According to an additional aspect, a non-transitory computer-readable storage medium includes instructions stored thereon that, when executed by a computing device cause the computing device to perform operations, the operations including setting a network throughput level setting to a default network traffic rate in a computer network, beginning a data protection operation at the network throughput level setting in the computer network, continually monitoring the computer network and determining that a condition has occurred in the computer network, dynamically adjusting the network throughput level setting in response to the condition by one of decreasing the network throughput level setting by a network traffic rate increment and increasing the network throughput level setting by the network traffic rate increment, and dynamically shaping network or storage traffic for the data protection operation using the network throughput level setting.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 7 illustrates an example of a data custody policy of the system according to an example embodiment.

DETAILED DESCRIPTION

Figure 1:
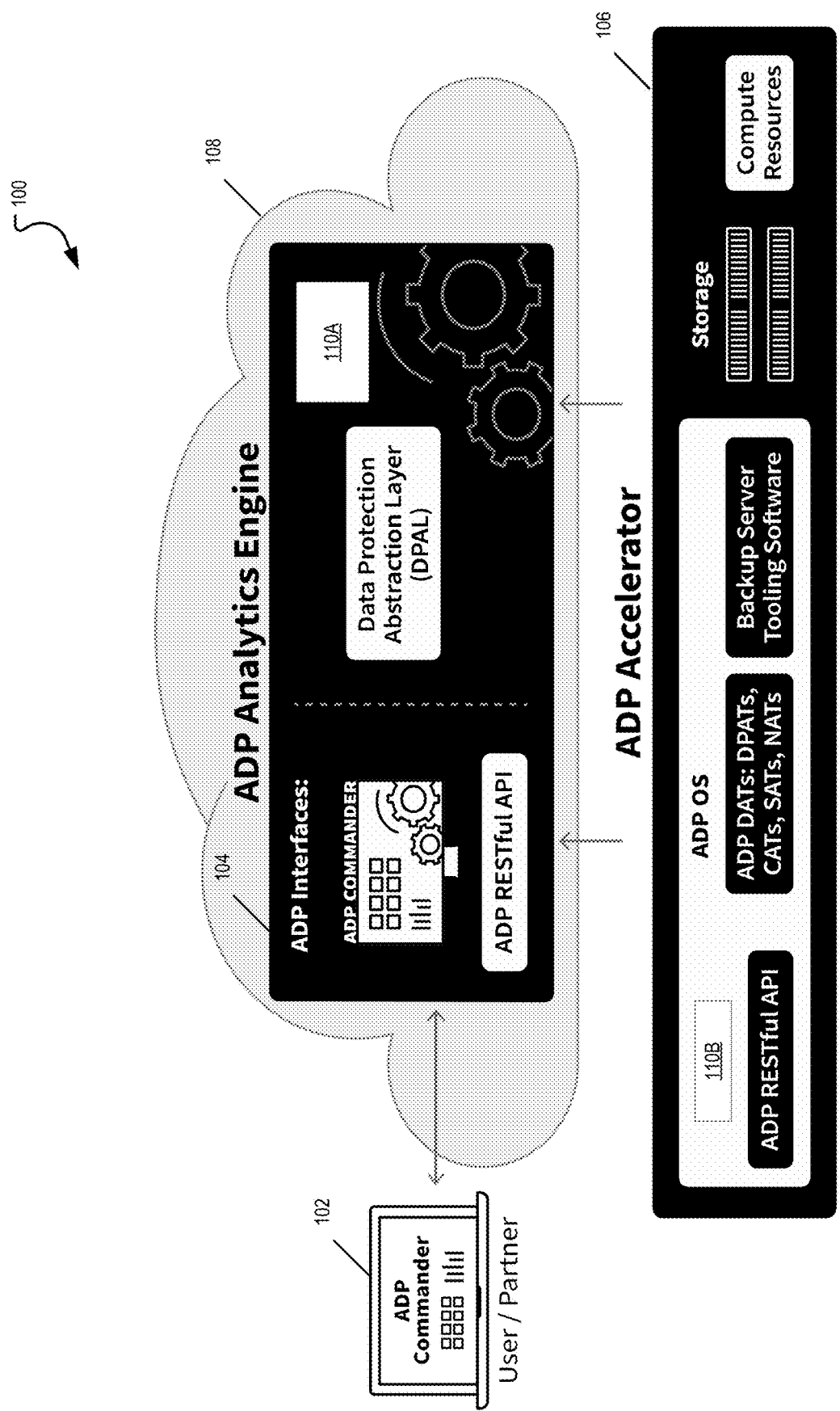
FIG. 1 is a block diagram of a data protection automatic optimization system according to an example embodiment.

For the purpose of promoting an understanding of the principles of the present disclosure, reference will now be made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

The client computing devices and the server computing devices may communicate over a communications network using Hypertext Transfer Protocol (HTTP) and/or other communications protocols. HTTP provides a request-response protocol in the client-server computing model. A client application running on the client computing device may be a client and a server application running on the server computing device may be the server, e.g., a web server. The client submits, for example, an HTTP request to the server. The web server of the server computing device provides resources, such as Hypertext Markup Language (HTML) files and/or other content, and performs other functions on behalf of the client, and returns an HTTP response message to the client. Other types of communications using different protocols may be used in other examples.

The one or more computing devices may communicate based on representational state transfer (REST) and/or Simple Object Access Protocol (SOAP). As an example, a first computer (e.g., a client computer) may send a request message that is a REST and/or a SOAP request formatted using Javascript Object Notation (JSON) and/or Extensible Markup Language (XML). In response to the request message, a second computer (e.g., a server computer) may transmit a REST and/or SOAP response formatted using JSON and/or XML.

Aspects of a system and method for discovering, monitoring, managing, automating, and optimizing components of a data protection infrastructure may include an analytics engine server computing device that executes a director application that optimizes a data protection infrastructure and provides automated, analytics-based optimizations of backup and data protection infrastructure and operations. The director application may provide automatic adjustment to high-fidelity data collection, automated operational responses to ransomware or cyber-attacks, optimization of data protection infrastructure and operations using automated best practices, automated data health remediation, optimizing data protection operation sequencing based on data custody discipline, and automated network or storage traffic shaping for data protection operations, among other improvements and features. The analytics engine server computing device may communicate via a network and work in conjunction with an accelerator server computing device that executes a manager application that also optimizes the data protection infrastructure and provides automated, analytics-based optimizations of backup and data protection infrastructure and operations. The manager application may obtain information associated with local hardware and software and send the information to the director application for instructions and direction on how to best optimize data protection. The manager application may receive and implement instructions and commands from the director application to automate and optimize data protection.

An enterprise may utilize a variety of hardware and software products from a variety of different vendors in an attempt to deal with the issues discussed herein. The products may add to the complexities, operational challenges, and costs associated with the problem. The products also may introduce additional data and data protection operational management issues. More advanced ways of monitoring and optimizing modern data protection infrastructures and operations are disclosed herein. In particular, the system discussed herein provides monitoring, managing, and health remediation of data protection infrastructure. Operations may be automatically adjusted based on events in the environment, advancements in best practices, and technology improvements, among others.

In addition, the system provides improvements in the abilities to detect, debug, and remediate transient failures, inefficiencies, and security exposures in complex, multi-vendor, multi-domain, and multi-cloud data protection environments. The system also further provides automation of data protection operations including automation of unexpected operational actions to deal with failures, security exposures, and/or inefficiencies in the data protection environment.

Some methodologies exist for discovering, monitoring, reporting, and management of backup infrastructure including but not limited to servers, networks, storage devices, cloud resources, backup servers, backup clients, deduplication appliances, applications, and snapshotting software. In addition, some methodologies exist for discovering, monitoring, reporting, and management of backup operations including but not limited to data backups, data restores, disaster recovery operations, performance planning, capacity planning, backup problem determination, product maintenance, license management, and others.

The conventional backup infrastructure and backup operations are especially lacking in discovering, monitoring, reporting, managing, and automation of backup infrastructure and operations across emerging multi-domain and multi-cloud environments. Conventional techniques are very restrictive and do not adequately protect multi-cloud environments. Some existing techniques attempt to automate operations around data protection. However, the automation is rudimentary and includes scripting of repetitive tasks such as scheduling backups and deploying data protection clients or reimplementing a failed backup task. This scripting is static and limited.

Further, the existing conventional backup infrastructure and operations do not provide extensive correlation and analysis of an ever-changing data protection landscape. They also do not dynamically adjust data protection and recovery monitoring operations to attempt more comprehensive discovery of transient and persistent operational issues in the environment. In addition, the existing conventional backup infrastructure and operations do not optimize modern data protection infrastructures and operations by automatically adjusting monitoring, managing, and health remediations based on events in the environment, advancements in best practices, and technology improvements. Further, they do not effectively detect, debug, and remediate transient failures, inefficiencies, and security exposures in complex, multi-vendor, multi-domain, and multi-cloud data protection environments. Even further, the existing conventional solutions do not adequately automate data protection operations, not only of expected tasks, but of unexpected operational actions to deal with failures, security exposures, and/or inefficiencies in the data protection environment. These issues are evidenced by the operational complexities and costs that enterprises struggle to deal with to provide data protection.

FIG. 1 shows a block diagram of a computing system that includes a data protection automatic optimization system 100 according to an example embodiment. The data protection automatic optimization system 100 includes at least one client computing device 102 that is in communication with at least one Adaptive Data Protection (ADP) analytics engine server computing device 104 (hereinafter ADP analytics server computing device) and at least one ADP accelerator server computing device 106 via a communications network 108.

According to an exemplary embodiment, the data protection automatic optimization system 100 may include one logical instance of the ADP analytics server computing device 104, a plurality of client computing devices 102, and a plurality of ADP accelerator server computing devices 106, among other computing devices. Each entity, company, organization, corporation, etc. may have its own particular ADP accelerator server computing device 106 that communicates with the ADP analytics server computing device 104. Each ADP accelerator server computing device 106 may be implemented based on particular workloads, a computing architecture, a network architecture, and a cloud computing network deployment for that particular entity.

In one embodiment, the ADP analytics server computing device 104 may include a plurality of hardware and software modules that may perform various functions. The ADP analytics server computing device 104 may receive metadata exhaust from each ADP accelerator server computing device 106 of the system 100 and may push information and messages to the ADP accelerator server computing device 106 such as software upgrades, configuration instructions, policies, operational commands, security controls, etc. In addition, the ADP analytics server computing device 104 may store and process information associated with analytical intelligence, automation, and best practice capabilities within its modules that may optimize ADP accelerator operations.

The ADP analytics server computing device 104 may include a data protection abstraction layer (DPAL) that may interact with ADP data acquisition tools (DATs) and may handle data protection, cloud computing, storage, and network products and services, enabling the management of data protection, cloud computing, storage, and network products and services in a consistent manner in the system 100. The ADP analytics server computing device 104 may provide an ADP commander user interface and a RESTful application programming interface (API). In an example embodiment, the ADP analytics server computing device 104 may provide capabilities and services that may be delivered as a service from at least one global cloud computing provider.

The ADP accelerator server computing device 106 may include compute resources (e.g., hardware servers, virtual servers (e.g., VMware virtual machines), and various cloud compute resources (e.g., virtual, bare metal, or hosted systems). A bare metal virtualization may include running a virtual operating system using a hypervisor. A hosted system may run a virtual operating system using virtual hardware on a host operating system, which uses physical hardware. The compute resources may include memory (e.g., RAM and/or ROM), network interfaces, management interfaces, storage area network (SAN) interfaces, and other resources.

The ADP accelerator server computing device 106 may include an ADP operating system (ADP OS) that provides management, monitoring, reporting, alerting, control, integration, orchestration, ADP analytics exhaust management, and other modules and services that may monitor and control data protection operations that may be monitored by the ADP accelerator server computing device 106 for the system 100. The ADP OS may provide environmental monitoring including the measuring of temperature, power, and other variables associated with the system 100 and its associated network, cloud computing system, and other computing systems and environments.

The ADP OS may provide ADP data acquisition tools (ADP DATs). The ADP DATs may manage, monitor, and control a variety of data protection, cloud computing, storage, and network products and services. ADP DATs may include a data protection acquisition tool (DPAT), cloud acquisition tool (CAT), storage acquisition tool (SAT), and a network acquisition tool (NAT).

Further, the ADP OS may include and manage backup server tooling software. This may include a set of backup server tooling software products (e.g., IBM SPECTRUM PROTECT™, VERITAS NETBACKUP™, VEEAM, etc.), cloud backup services, server or storage snapshot utilities, application backup tools, or other backup or replication utilities that may execute many backup, restore, and long term data retention operations on data in the system 100 and its associated network, cloud computing system, and other computing systems and environments. In addition to backup server tooling software, the ADP OS also may include and manage operating system software associated with computing devices in the system 100, file systems associated computing devices of the system 100, and other software resources associated with the system 100.

In short, the ADP OS may interact with the ADP analytics server computing device 104 to manage and automate data protection operations of the system 100.

Storage of the system 100 may include backups of system user data that may be stored where the user desires, e.g., on local storage computing devices and on cloud storage, among other locations. Storage may be physically included in the ADP accelerator server computing device 106 and/or may be separate such as external storage arrays and/or stored on cloud-based storage. However, the storage may appear to a user as being logically attached to the ADP accelerator server computing device 106 and may be used by ADP accelerator server computing device services.

According to an example embodiment, the ADP accelerator server computing device 106 may be deployed on client premises, in a data center, in a remote office, in a private cloud computing environment, in a public cloud computing environment, and in a third-party hosting/data center, among other locations. The ADP accelerator server computing device 106 may be deployed as a virtual appliance in a virtual environment (e.g., VMWARE® Cloud), as a physical appliance, or in a public cloud computing environment (on virtual, bare metal, or hosted systems). In order to provide greater degrees of data security and availability, the ADP accelerator server computing device may be configured to create additional copies of data via services such as data replication and data copies to various media types, or storage classes.

The ADP accelerator server computing device 106 may have associated data protection hardware and software infrastructure that may include the compute resources discussed above, the storage discussed above, network components, traffic patterns, firmware levels, microcode, data protection software tooling, cloud functionality, and others. In addition, the ADP accelerator server computing device 106 may be in communication via the communications network 108 with additional data protection infrastructure including other protected servers, storage devices, applications, data, backup servers, networks, deduplication appliances, cloud workloads, and others.

In one embodiment, the ADP accelerator server computing device 106 may be considered an ADP conduit. An ADP conduit may provide industry services such as ticketing, orchestration, service management, and other solutions. An ADP conduit may be deployed to implement special security access controls that may be requested for various customer environments.

The ADP accelerator server computing device 106 may operate autonomously from the ADP analytics server computing device 104 but also may be integrated with the ADP analytics server computing device 104. The ADP accelerator server computing device 106 may share metadata exhaust data with the ADP analytics server computing device 104 and may in return receive analytics-derived guidance in order to optimize data protection operations for the system 100. In addition, operating system software, ADP OS software, backup server tooling software, device firmware/microcode, and other software may be transmitted from the ADP analytics server computing device 104 to the ADP accelerator server computing device 106.

The system 100 may include adaptive data protection interfaces including a graphical user interface (GUI) and a RESTful API as discussed above. The system 100 provides ADP Commander, a GUI that comprises a dashboard portal that graphically provides information regarding the system 100. The ADP Commander may be presented from the perspective, view, and authentication permissions of each user of the system 100. In addition, an administrator of the system 100 may access the portal to view the status for each user/partner associated with the system 100. The administrator may resolve issues, execute ADP accelerator server computing device 106 deployments, and may view analytics regarding the system 100 or individual customer domains. Services and solutions of the data protection automatic optimization system 100 may be shared amongst, and delivered through, multiple partners (e.g., separate companies and organizations and sub-organizations of companies) to multiple sets of clients and customers. A partner of the system 100 may view a particular portion of the system environment from the perspective, view, and authentication permissions of the partner. A partner may view partner customer environments. End users of the system 100 may view a portion of the system 100 from the perspective, view, and authentication permissions of the user. A customer may view ADP accelerator server computing device information and computing devices that may be associated with the ADP accelerator server computing device 106.

The ADP Commander user interface may provide complete multi-tenancy functions/features at different levels (e.g., partners, users) and may provide comprehensive reporting, monitoring, control, security, chargeback, showback, provisioning of client computing devices, policy management, capacity management, management of system inventories, and others at all levels.

In addition, the RESTful API provides ADP functionality and all ADP functions may be accessed and managed using the RESTful API.

The ADP analytics server computing device 104 may have an ADP analytics director application 110A and the ADP accelerator server computing device 106 may have an ADP analytics manager application 110B that communicates with storage that may include at least one database that comprises a non-relational database and/or a relational database for storing user information, among other data. As an example, the information may be stored in a relational database management system (RDBMS), an open source distributed database management system such as a Not only SQL (NoSQL) database management system, an in-memory database (IMDB) management system, or another appropriate database management system. As an example, each user associated with the system 100 may have associated information stored in the database such as an identifier associated with the user and a role associated with the user that may be dynamically modified by the system 100.

The client computing device 102 may include a display and an input device. The display is used to display visual components of the ADP analytics director application 110A, such as at a user interface, e.g., ADP Commander. In one example, the user interface may display a user interface of the ADP analytics director application 110A, and a representation of the requested resources received from the ADP analytics server computing device 104. The display can include a cathode-ray tube display, a liquid-crystal display, a light-emitting diode display, a touch screen display, and/or other displays. The input device is used to interact with the ADP analytics director application 110A or otherwise provide inputs to the client computing device 102 and may include a mouse, a keyboard, a trackpad, and/or the like. The input device may be included within the display if the display is a touch screen display. The input device allows a user of the client computing device 102 to manipulate the user interface of the ADP analytics director application 110A or otherwise provide inputs to be transmitted to the ADP analytics server computing device 104.

The at least one ADP analytics server computing device 104 is configured to receive data from and/or transmit data to the at least one client computing device 102 through the communications network 108. Although the at least one ADP analytics server computing device 104 is shown as a single server, it is contemplated that the at least one server computing device 104 may include multiple servers, for example, in a cloud computing configuration.

The one or more computing devices communicate and coordinate their actions by passing messages over the communications network 108. The communications network 108 can be one or more of the Internet, an intranet, a cellular communications network, a WiFi network, a packet network, or another wired and/or wireless communication network or a combination of any of the foregoing. As an example, the one or more computing devices communicate data in packets, messages, or other communications using a common protocol, e.g., Hypertext Transfer Protocol (HTTP) and/or Hypertext Transfer Protocol Secure (HTTPS). As an example, the data protection automatic optimization system 100 may be a cloud-based computer system or a distributed computer system that may include one or more cloud-based computer systems including AMAZON WEB SERVICES, VMWARE CLOUD, MICROSOFT AZURE, IBM CLOUD, GOOGLE CLOUD PLATFORM, ALIBABA CLOUD, and other cloud computing services.

The ADP analytics director application 110A may be a component of an application and/or service executable by the client computing device 102 and/or the ADP analytics server computing device 104 and/or the ADP accelerator server computing device 106. For example, the ADP analytics director application 110A may be a single unit of deployable executable code or a plurality of units of deployable executable code. According to one aspect, the ADP analytics director application 110A may be a web application, a native application, and/or a mobile application (e.g., an app) downloaded from a digital distribution application platform that allows users to browse and download applications developed with mobile software development kits (SDKs) including the App Store and GOOGLE PLAY®, among others. The ADP analytics director application 110A may be installed on the client computing device 102, which may have a WINDOWS operating system, APPLE MACOS operating system, a Linux operating system, the iOS operating system or an ANDROID™ operating system, among other operating systems. In an exemplary embodiment, the ADP analytics director application 110A may include a first client component executed by the client computing device 102 and a second server component executed by the at least one ADP analytics server computing device 104 and/or the ADP accelerator server computing device 106.

First, the system 100 provides monitoring and data collection. Optimization of data protection infrastructure and operations begins with comprehensive and ongoing discovery, data collection, and monitoring of all aspects of the data protection environment. The ADP DATs may perform ongoing health, capacity, and performance monitoring and data collection of all data protection, cloud, storage, and network products and services. The monitoring and data collection may include the gathering of capacity and performance metrics (e.g., utilization rates, storage capacities, data throughput rates, I/O rates, etc.) and current health status (e.g., offline, online, in-progress, failed, failing, etc.) of all components and aspects of the data protection environment. A variety of events within the environment (e.g., a failed storage or network device, a fire, a security breach, a backup job completion, a database failure, a power outage, a business audit, etc.) and events outside of but associated with the environment (e.g., weather events, government alerts, etc.) may also be monitored and assessed. Conditions of the components, operations, and entire data protection environment may include an assessment of events, metrics, and current health status of all components and aspects of the data protection environment. For example, storage utilization, data throughput rates, and other metrics being within acceptable ranges assessed along with a health status of all devices being online may constitute a normal operating condition for a storage array. As a further example, metrics on a data protection operation (e.g., number of backups running, number of failed backups, amount of data and files backed up daily per client computing device, deduplication rates, etc.) may be assessed as normal operating conditions for data protection operations. As another example, a dramatic increase in metrics such as amounts of data and files backed up daily for multiple users combined with a dramatic decrease in data deduplication rate metrics may change a security condition code to indicate a ransomware attack is underway.

Under normal operating conditions, data are collected at regular periods of time. In addition, under normal operating conditions, data may be aggregated and/or summarized when passed back to the ADP analytics server computing device 104. In addition, the ADP analytics server computing device 104 and the ADP accelerator server computing device 106 may provide extensive monitoring of metrics, events, and conditions across the environment and may perform analysis, automated operations, and problem resolution based on the monitoring.

The system 100 also provides automatic adjustment to high-fidelity data collection. Upon occurrence of one of various events or conditions, the ADP analytics server computing device 104 may automatically instruct the ADP DATs to increase or decrease the frequency and/or the level of detail of data collected from components associated with the events or conditions. The high-fidelity data collection may be flagged to forego normal data aggregation or summarization and may be passed directly to the ADP analytics server computing device 104 for more detailed analytics. The automatic adjustment to component data collection may harvest more relevant, detailed data with which to more accurately evaluate and analyze operational issues in the environment than is normally possible. In addition, it may provide a much greater opportunity to capture information related to transient issues or failures in the environment and may provide a greater opportunity to accurately predict upcoming failures.

Various events or conditions that may trigger an automatic adjustment to high-fidelity data collection may include (1) events such as component failures, errors, or warnings, (2) events such as backup failures, errors, or warnings in backup server tooling software, (3) events such as significant deviations in capacity, performance, or other metrics for servers, storage, networks, cloud services, or data protection tooling, (4) operational conditions such as degraded network, storage, or systems, (5) business events such as audits or technology projects, and (6) business conditions such as high security alert levels, and others.

In addition, the automatic adjustment to component data collection may continue for a policy determined length of time or it may continue until it is automatically readjusted by the ADP analytics server computing device 104 when the events or conditions have passed or have been resolved. In one example, disk errors or other failures or warnings from a storage device may be collected by the storage acquisition tool (SAT) for that storage device and may be detected by the ADP analytics server computing device 104. The ADP analytics server computing device 104 may then automatically instruct the SAT for the storage device to increase the level of detail of data collected (e.g., collect all system and error logs) and/or increase the frequency of performance data collection for the storage device. As an example, the ADP analytics server computing device 104 may request a second level of data that is higher or more robust than a first level of data. The automatic adjustment to high-fidelity data and the increased frequency of data collection may enable more thorough examination of the failures or potential failures.

In another example, significant deviations from normal network or device performance metrics may be detected by the ADP analytics server computing device 104, which may automatically instruct the NATs and/or SATs to increase the frequency of performance data collection of the network and/or storage devices associated with the performance deviations.

In another example, deviations in normal operating behavior of backup server tooling software (e.g., increased numbers of backup failures, backup server warnings or failures, or backup client warnings or failures) may be detected by the ADP analytics server computing device 104, which may request additional information such as client and server error logs, backup server data logs, and other information to be gathered by the DPAT. This additional information may be available for deeper analysis of operations by the ADP analytics server computing device 104.

In a further example, the ADP analytics server computing device 104 may automatically detect events such as disk errors (or other storage device failures or warnings) and may automatically detect that network deviations or device performance deviations have been resolved. When this occurs, the ADP analytics server computing device 104 may automatically revert data collection detail level and/or frequency back to a normal setting.

The system 100 may also provide automated operational responses to ransomware or cyber-attacks. The ADP analytics server computing device 104 may continually analyze various metrics, events, and conditions in the data protection environment for indications of ransomware or a cyber-attack. As an example, data protection metrics that may be analyzed by the ADP analytics server computing device 104 may include backup deduplication rates, backup data traffic, daily backup change rates, a number of files backed up daily per client computing device, activity of storage devices, and other operational metrics. As another example, the ADP analytics server computing device 104 may continually monitor for events such as a physical or network security breach, unusually high security login activity, or security alerts from network systems as indicators of ransomware or a cyber-attack. Further, the ADP analytics server computing device 104 may continually monitor conditions such as security alert levels in business security systems for indications of ransomware or a cyber-attack. Such monitoring of business security systems may be done via application programming interface (API) integration or by triggered events from business security systems.

Cryptovirology or ransomware attacks may leverage cryptography to encrypt data to make it inaccessible without special keys from an attacker. The malicious data encryption may result in dramatic changes in backup deduplication rates, backup data traffic, daily backup change rates, a number of files backed up daily per client computing device, and other operational metrics. The ADP analytics server computing device 104 may detect such changes that may indicate a ransomware attack. In addition, business security alert systems, the United States Computer Emergency Readiness Team (US-CERT), or other ransomware attack monitors may issue security alerts or set security alert levels to indicate that a ransomware attack has occurred. The ADP analytics server computing device 104 may detect the ransomware alerts and indicators. When the ADP analytics server computing device 104 detects a ransomware attack, it may take automated actions to avert, minimize, and remediate associated damage.

In one example, the ADP analytics server computing device 104 may analyze all metrics to determine which systems, devices, directories, files, databases, or other data have possibly been infected. Audit reports may be sent automatically to authorized data administrators, business executives, users, and other authorized individuals. In addition, the ADP analytics server computing device 104 may restrict or remove access to infected data and systems and potentially other data and systems. This may isolate the ransomware threat.

In addition, when ransomware is detected, the ADP analytics server computing device 104 may determine affected data, initiate recovery of affected data from the backup server tooling software to an original location or to a safe location, and/or initiate data replication or increase the frequency of data replication of the latest backup versions of all affected data from the backup server tooling software to an off-site location to preserve the most current copies of affected data off-site and protect the data using airgap storage. This may allow critical business data to be automatically removed from the site of the security attack before information officers are even aware of the attack.

The ADP analytics server computing device 104 may optimize data protection infrastructure and operations using automated best practices. As an example, disk errors, failures, or warnings may be provided by a storage device and sent to the ADP analytics server computing device 104. In this case, the ADP analytics server computing device 104 may take automated actions based on best practices. As an example, the ADP analytics server computing device 104 may automatically extend retention periods for associated backup data and/or storage devices storing the associated backup data that may be suffering from the disk errors, storage device failures, or backup failures. As an example, the ADP analytics server computing device 104 may perform at least one of identifying data that might be affected by one of a warning and an error on a storage device, extending retention periods for backup data and backup media associated with the data that might be affected by the one of the warning and the error on the storage device, initiating backup of the data that might be affected by the one of the warning and the error on the storage device, and validating integrity of the data that might be affected by the one of the warning and the error on the storage device, among other operations.

In addition, the ADP analytics server computing device 104 may monitor and maintain versions of various software and microcode in the data protection environment. When it is determined that a new software release or a patch resolves an error or failure in the data protection environment, the ADP analytics server computing device 104 may automatically deploy the software release or patch to the data protection environment computing devices that have similar components and configurations.

In a further example, the backup server tooling software integrity may be maintained. The ADP accelerator server computing device 106 may continually monitor the backup server tooling software. The backup server tooling software may regularly backup. If a backup of the backup server tooling software fails, the ADP analytics server computing device 104 may perform an analysis of error messages, infrastructure status, resource utilization levels, and other information to determine the cause of the failures. Identified problems that may be resolved may be automatically addressed. As an example, if a storage device is out of space, additional storage resources may be provisioned locally or using cloud-based storage devices. In addition, backup server tooling software database failures may be resolved by reorganizing the database having the failures. Alerts may be provided by the ADP analytics server computing device 104 to indicate that the identified problems have been automatically resolved. In addition, the ADP analytics server computing device 104 also may send an alert that indicates that the problem cannot be addressed automatically. Backups of the backup server tooling software may be rerun and monitored until they are successful.

In addition, the system 100 may dynamically adjust a backup data target repository based on storage availability, storage health, and other events or conditions in the environment. Backup data may be stored on a target storage repository. The target storage repository may be a certain type of storage device such as a flash storage device, a disk storage device, a tape storage device, a virtual tape storage device, and a cloud storage device. The target storage repository may have a locality that may be one or more of local, remote, and cloud. Existing conventional solutions may choose a target storage repository for backup data based on policy, size of the data, and service levels associated with data recovery. Existing conventional solutions also may copy or migrate data between target storage repositories based on policy, age of data, repository utilizations, and others.

The system 100 may utilize advanced monitoring of target storage repositories, analyze various conditions and events in the environment, and dynamically select target storage repositories, such as a cloud storage device for backup data based on current conditions. In one example, an analytics manager module of the ADP accelerator server computing device 106 may detect a target storage repository that may be experiencing high space utilization or may be experiencing errors on one or more of its devices and may instruct the backup server tooling software to bypass the target storage repository and use another target storage repository for a specific backup data operation. In another example, the analytics director module of the ADP analytics server computing device 104 may detect that there is a high security alert condition in the environment, or may detect that there is an issued US-CERT alert event, or may detect that there is a current ransomware attack event, or may detect that there is severe weather, flood, or fire event in the locality of the target storage repository, or may detect some other condition or event requiring different target storage repository selection. The analytics manager module of the ADP accelerator server computing device 106 may instruct the backup server tooling software to direct backup data for current backup data operations to move to an offsite repository or a cloud target storage repository.

Additionally, if one of various events or conditions occurs in the environment, the ADP analytics server computing device 104 may automatically perform data health remediation actions to optimize data protection operations and data custody discipline. The ADP analytics server computing device 104 may automatically initiate one or more service calls as needed for devices or components that may have failed or may be in the process of failing.

When the ADP analytics server computing device 104 detects certain warnings or failures or device errors on a primary storage array, the ADP analytics server computing device 104 may perform automated steps to remediate the health of associated data and maintain data custody discipline. The ADP analytics server computing device 104 may determine the systems, databases, file systems, and applications that may have associated data on the failing array. The ADP analytics server computing device 104 may inform the backup server tooling software to initiate automated, out-of-schedule backups or make replicated off-site copies of the data associated with the systems, databases, file systems, and applications. This may allow the system to obtain the very latest versions of data and any data that may be exposed to potential loss may be automatically ingested by the system 100.

In another example, if ransomware is detected that affects data, the ADP analytics server computing device 104 may instruct the backup server tooling software to initiate data replication of the latest backup versions of all affected data from the backup server tooling software to an off-site location. In addition, the ADP analytics server computing device 104 may initiate recovery and validation of all affected data to a safe location. In addition, the ADP analytics server computing device 104 may perform various data health validation operations when backup failures are detected. The backup failures may be associated with other associated conditions or events (e.g., device errors on the systems experiencing backup failures). In another example, the ADP analytics server computing device 104 may initiate restoration and validation of portions of data from previous backups that may be failing.

In addition, the system 100 may optimize data protection operation sequencing based on data custody discipline using a data custody policy. The data custody policy may include specification of General Data Protection Regulation (GDPR) data custody level (e.g., data controller, data processor) and other governing compliance requirements, business priority of data, data retention requirements, data security requirements (e.g., encryption levels, who has access to data), data resiliency requirements (e.g., data may have a replicated off-site location or a copy in another cloud region different from a current location), data locality specifications (e.g., where data may reside or not reside), a level of allowed network throughput, and other data custody disciplines. The ADP analytics server computing device 104 may use the data custody policy, data service level policy, business project priorities, and other input to prioritize automated data protection operations. In one example, if a backup fails, it may only be reinitiated based on the data custody policy. A backup retry, a data replication, or an automated data validation of a backup may be allowed based on the data custody policy.

In another example, daily backup processing and daily replication operations may be prioritized based on the data custody policy, a data service level policy, business project priorities, or others. As a result, the data backup or data replication operations may be tiered based on data priority.

The system 100 may provide automated network traffic shaping for data protection operations. It is known that network bandwidth and utilization may be important factors in enterprise data protection operations. Conventional solutions may provide network throttling but they are not sophisticated enough to manage network utilization and optimize operations.

The ADP analytics server computing device 102 may provide for and maintain multiple levels of network throughput for data protection operations within available network bandwidth. Different levels of network throughput may be allowed for various operations based on a time of day, a data protection operation being performed, business priority of the data being transferred, locality of data, the data custody policy, and a data service level policy.

In a further example, the ADP analytics server computing device 104 may dynamically adjust or shape network traffic throughput allowed based on current network utilization levels, network error rates, security alert levels, locality of data, and/or other conditions or events in the environment. Current network utilization levels may be monitored by the NATs. If the network utilization levels increase, the ADP analytics server computing device 104 may dynamically and temporarily lower the network throughput levels allowed for data protection operations. Conversely, if the network utilization levels decrease, the ADP analytics server computing device may dynamically and temporarily raise the network throughput levels allowed for data protection operations. The temporary adjustment of network throughput levels may be adjusted for a specified period of time or they may be dynamically adjusted based on the network utilization. In another example, network throughput levels for backup operations may be low during normal business hours to allow for normal business data traffic. However, if there is a certain condition or event (e.g., an upcoming thunderstorm or hurricane for a location or there is a detected failing storage device) then network throughput levels may be temporarily increased to allow for greater throughput for special data protection operations such as local backups or data replications to off-site locations.

Figure 2:
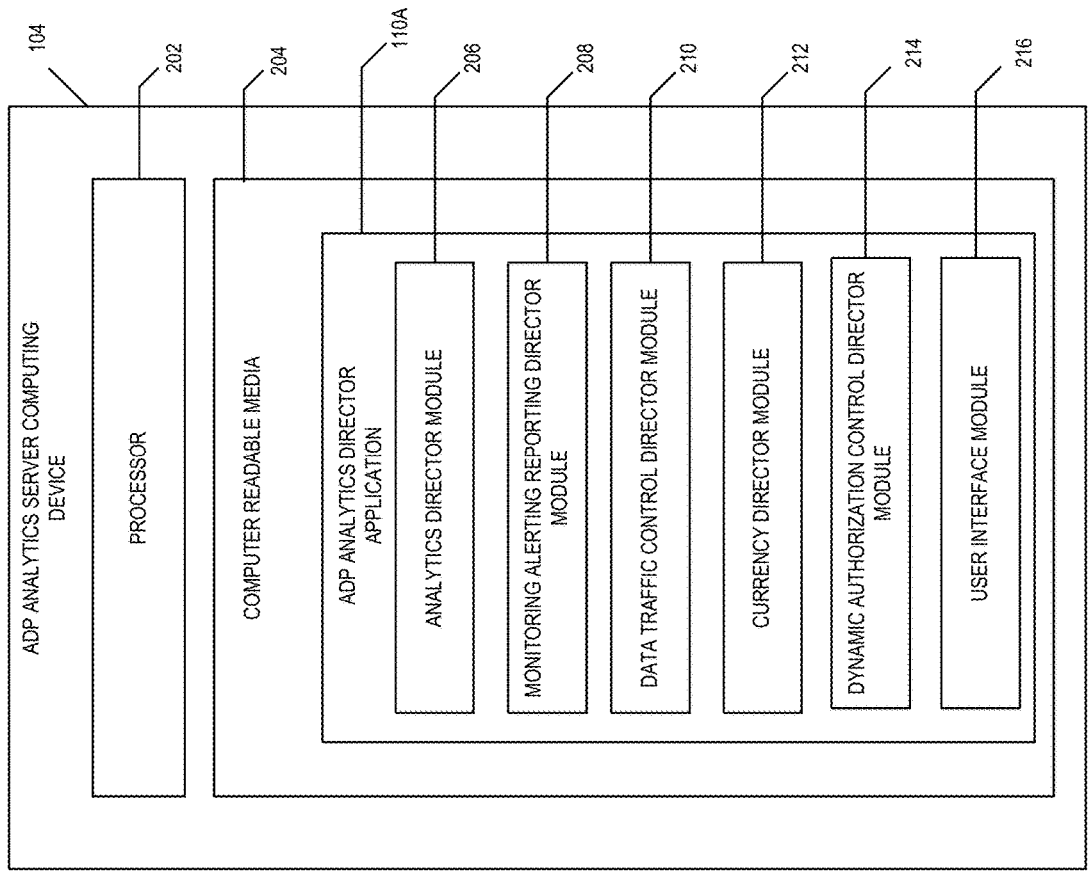
FIG. 2 illustrates a block diagram of a server computing device of the system according to an example embodiment.

FIG. 2 illustrates a block diagram of the ADP analytics server computing device 104 according to an example embodiment. The ADP analytics server computing device 104 may be a computer having a processor 202 and memory, such as a laptop, desktop, tablet computer, mobile computing device (e.g., a smartphone), or a dedicated electronic device having a processor and memory. The one or more processors 202 process machine/computer-readable executable instructions and data, and the memory stores machine/computer-readable executable instructions and data including one or more applications, including the ADP analytics director application 110A. The processor 202 and memory are hardware. The memory includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory may also include a dedicated file server having one or more dedicated processors, random access memory (RAM), a Redundant Array of Inexpensive/Independent Disks (RAID) hard drive configuration, and an Ethernet interface or other communication interface, among other components.

The ADP analytics server computing device 104 uses the ADP analytics director application 110A to transmit data, messages, and/or resources to the one or more client computing devices 102 and receive messages, data, and/or resources from the one or more client computing devices 102.

In order to obtain access to protected resources associated with the ADP analytics server computing device 104, e.g., data stored on protected computing devices or resources stored in the storage of the ADP accelerator server computing device 106, the client computing device 102 optionally may transmit a request or other communication, such as with a representation of a username and a password, to the ADP analytics server computing device 104 using lightweight directory access protocol (LDAP), HTTP, hypertext transport protocol secure (HTTPS) and/or other protocols. The request may be a LDAP request, a representational state transfer (REST) request, a Simple Object Access Protocol (SOAP) request, or another type of request. The ADP analytics server computing device 104 optionally verifies the username and password and transmits a response or other communication to the client computing device 102 or otherwise grants access to the client computing device to create and view data. The ADP analytics server computing device 104 may transmit an HTTP response, an HTTPS response, a LDAP response, a REST response, a SOAP response, and/or another type of response.

The username and password may be encrypted by the client computing device 102 using transport layer security (TLS), secure sockets layer (SSL), and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the ADP analytics server computing device 104 without directly sending the username and password to the ADP analytics server computing device 104 via the communications network 108.

The ADP analytics server computing device 104 includes computer readable media (CRM) 204 in memory on which the ADP analytics director application 110A or other user interface or application is stored. The computer readable media may include volatile media, nonvolatile media, removable media, non-removable media, and/or another available medium that can be accessed by the processor 202. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The ADP analytics director application 110A includes the following modules. The modules may include sub-modules that may be associated with the ADP accelerator server computing device 106 and thus portions of the ADP analytics director application 110A may be executed by the ADP accelerator server computing device 106.

The ADP analytics director application 110A may include an analytics director module 206. The analytics director module 206 performs correlation and analytics of components, events, and conditions across the entire system 100 and it drives various actions to optimize data protection operations. The ADP analytics director module 206 may continually interact with the other modules of the ADP analytics director application 110A.

The ADP analytics director application 110A may include a monitoring alerting reporting director module 208 that monitors all components, events, conditions, and data protection operations across the system 100. The monitoring alerting reporting director module 208 may receive and correlate monitoring data from the ADP accelerator server computing device 106. The components that are monitored may include physical servers, virtual servers, cloud infrastructure, storage devices, cloud storage, network devices, data protection software, applications, orchestration and service management solutions, operating systems, data, deduplication appliances, audit logs, security logs, and others. Some of the monitoring of the components may be accomplished in conjunction with the ADP DAT.

Events and conditions in the environment that may be monitored may include data traffic patterns, network and device performance, resource capacity utilizations, device firmware levels, cloud functionality and features, status of cloud resources, temperatures, power levels, security alerts, data protection activities and operations, system and network availability, indications of ransomware or cyber-attack, operational or component failures, business conditions, weather conditions that may impact operations, and others. Data from all event and condition monitoring may be sent from the ADP accelerator server computing device 106 to the monitoring alerting reporting director module 208. In addition, the monitoring alerting reporting director module 208 may perform event and condition monitoring at a business and global level.

Data protection operations that may be monitored may include data backups and restores, off-site replication for disaster recovery, disaster recoveries, backup server tooling software backups and restores, backup software installs or upgrades, backup server tooling software maintenance operations, data migrations including to or across cloud environments, and others.

The monitoring alerting reporting director 208 may share information about component status, conditions, and events in the data protection environment. In addition, the monitoring alerting reporting director 208 may perform reporting and may send alerts based on component status, events, and conditions.

The ADP analytics director application 110A may include a data traffic control director module 210 that analyzes monitoring data from the monitoring alerting reporting director module 208 and provides for and maintains multiple levels of network and storage throughput allowable for data protection operations. The data traffic control director module 210 also may dynamically adjust or shape network or storage traffic throughputs allowed based on current network utilization levels, storage utilization levels, security alert levels, locality of data, network utilization by user, and/or other conditions or events in the environment.

The ADP analytics director application 110A may include a currency director module 212 that maintains a software code library of various software images for all components of the data protection infrastructure and environment including backup server tooling software, operating system software, and server, storage, and network device microcode. The currency director module 212 also tracks software release levels on components of the environment and may automatically download, install, and configure software for the components of the environment as needed. In addition, the currency director module 212 may apply certain software release images and/or software patches to resolve or avoid failures based on analysis of conditions or events across the environment.

The ADP analytics director application 110A may include a dynamic authorization control director module 214 to provide multiple dimensions of authorization control. As an example, correlation and analysis of factors in the environment may be used to dynamically adapt authorization privileges (e.g., roles and permissions). The correlation and analytics may result in additional layers or dimensions of authorization control management that may be added dynamically to authorization control permission. The correlation and analytics may be used by the ADP accelerator server computing device 106 with regard to allowed security behaviors and actions.

The ADP analytics director application 110A includes a user interface module 216. The user interface module 216 receives requests or other communications from the client computing devices 102 and transmits a representation of requested information, user interface elements, and other data and communications to the client computing device 102 for display. As an example, the user interface module 216 generates a native and/or web-based graphical user interface (GUI) that accepts input and provides output by generating content that is transmitted via the communications network 108 and viewed by a user of the client computing device 102. The GUI may be the ADP Commander discussed herein. The user interface module 216 may provide realtime, automatically and dynamically refreshed information to the user of the client computing device 102 using Java, Javascript, AJAX (Asynchronous Javascript and XML), ASP.NET, Microsoft.NET, and/or node.js, among others. The user interface module 216 may send data to other modules of the ADP analytics director application 110A of the ADP analytics server computing device 104 and retrieve data from other modules of the ADP analytics director application 110A of the ADP analytics server computing device 104 asynchronously without interfering with the display and behavior of the ADP analytics director application 110A displayed by the client computing device 102. As an example, data may be retrieved using XMLHttpRequest objects or using WebSockets.

Figure 3:
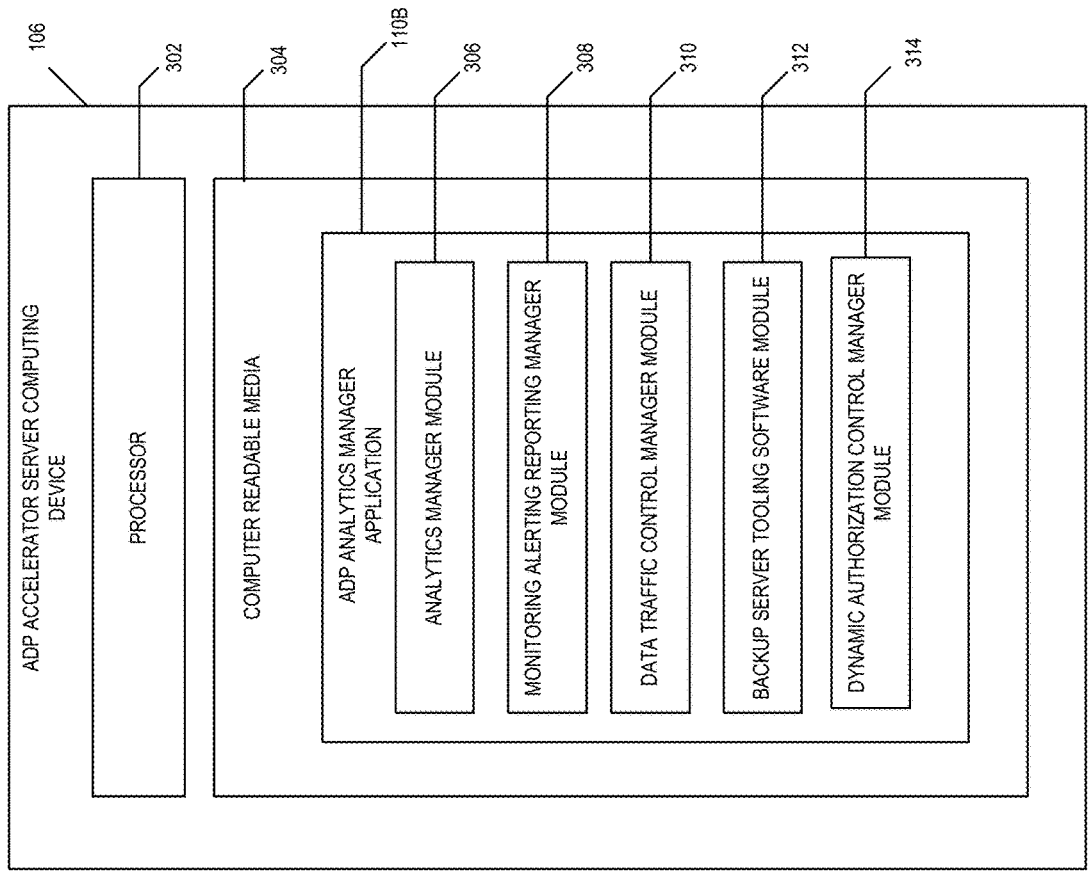
FIG. 3 illustrates a block diagram of another server computing device of the system according to an example embodiment.

FIG. 3 illustrates a block diagram of the ADP accelerator server computing device 106 according to an example embodiment. The ADP accelerator server computing device 106 may be a computer having a processor 302 and memory, such as a laptop, desktop, tablet computer, mobile computing device (e.g., a smartphone), or a dedicated electronic device having a processor and memory. The one or more processors 302 process machine/computer-readable executable instructions and data, and the memory stores machine/computer-readable executable instructions and data including one or more applications, including the ADP analytics manager application 110B. The processor 302 and memory are hardware. The memory includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory may also include a dedicated file server having one or more dedicated processors, random access memory (RAM), a Redundant Array of Inexpensive/Independent Disks (RAID) hard drive configuration, and an Ethernet interface or other communication interface, among other components.

The ADP accelerator server computing device 106 includes computer readable media (CRM) 304 in memory on which the ADP analytics manager application 110B or other user interface or application is stored. The computer readable media may include volatile media, nonvolatile media, removable media, non-removable media, and/or another available medium that can be accessed by the processor 302. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The ADP analytics manager application 110B may include an analytics manager module 306 that receives data, performs analysis and implements behaviors in the ADP accelerator server computing device 106 based on components, events, and conditions in the data protection environment associated with the ADP accelerator server computing device 106. The ADP analytics manager module 306 also transmits the data as received to the ADP analytics server computing device 104. According to an example embodiment, the ADP accelerator server computing device 106 may drive local efficiencies and automated actions based on conditions in the ADP accelerator server computing device 106 and in the associated local environment.

The ADP analytics manager application 110B may include a monitoring alerting reporting manager module 308 that monitors and collects data from components in the environment associated with the ADP accelerator server computing device 106 including physical servers, virtual servers, cloud infrastructure, storage devices, cloud storage, network devices, data protection software tooling, applications, orchestration and service management solutions, operating systems, data deduplication applications, audit logs, security logs, and others. Events and conditions that may be monitored in the environment may include data traffic patterns, network and device performance, resource capacity utilizations, device firmware levels, cloud functions and features, status of cloud resources, temperatures, power levels, security alerts, data protection activities and operations, system and network availability, indications of ransomware or cyber-attack, operational or component failures, business conditions, weather conditions that may impact operations, and other information. Data associated with the events and conditions collected by the monitoring alerting reporting manager module 308 may be transmitted to the monitoring alerting reporting director module 208.

Data protection operations that may be monitored by the monitoring alerting reporting manager module 308 may include data backups and restores, off-site replication for disaster recovery, disaster recoveries, backup server tooling software backups and restores, backup software installs or upgrades, backup server tooling software maintenance operations, data migrations including to or across cloud environments, and other data protection operations. Data associated with the data protection operations may be collected by the monitoring alerting reporting manager module 308 and transmitted to the monitoring alerting reporting director module 208.

The ADP analytics manager application 110B may include a data traffic control manager module 310 that controls and coordinates data traffic and network throughput levels as instructed by the data traffic control director module 210. Data traffic is controlled by coordinating the amount of network traffic being generated by various data protection operations and restricting the amount to be within currently allowed network throughput levels. The data traffic control manager module 310 may control the amount of network traffic in coordination with the backup server tooling software, the DATs, and other components. The data traffic control manager module 310 may also control the amount of data traffic from data protection operations going to or from storage devices. Thus, the data traffic control manager module 310 may control the data traffic, behaviors, and actions of the ADP accelerator server computing device 106.

The ADP analytics manager application 110B may include a backup server tooling software module 312. As discussed above, the backup server tooling software module 312 is in communication with the ADP OS and manages backup server tooling software. This may include a set of backup server tooling software products (e.g., IBM SPECTRUM PROTECT™, VERITAS NETBACKUP™, VEEAM, etc.) that may execute many backup and restore operations on data in the system 100 and its associated network, cloud computing system, and other computing systems and environments.

Figure 4:
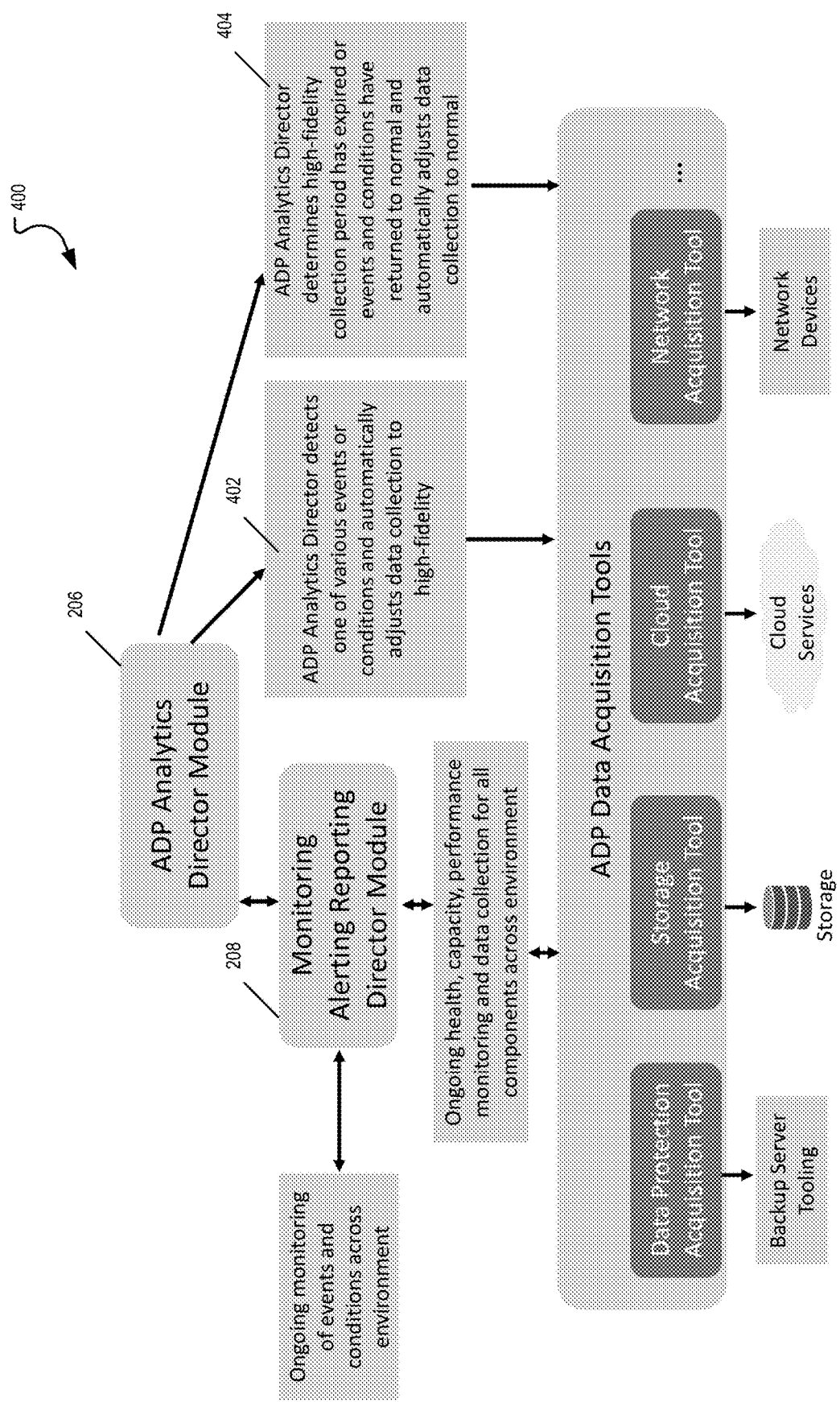
FIG. 4 illustrates a flowchart of a process for automatic adjustment to high-fidelity data collection according to an example embodiment.

The ADP analytics manager application 110B may include a dynamic authorization control manager module 314 that is dynamically directed by the dynamic authorization control director module 214 with respect to currently allowed security behaviors and actions. The dynamic authorization control manager module 314 may receive directions and control the security behaviors and actions for the ADP accelerator server computing device 106 as well as the system 100 and its associated network, cloud computing system, and other computing systems and environments FIG. 4 illustrates a flowchart of a process 400 for automatic adjustment to high-fidelity data collection according to an example embodiment. In a first step 402, the analytics director module 206 of the ADP analytics server computing device 104 detects one of various events or conditions and automatically adjusts to high-fidelity data collection. Next, in step 404, the analytics director module 206 may determine that the high-fidelity data collection has expired or may determine that events and conditions have returned to normal and may automatically adjust data collection back to a normal level. The monitoring alerting reporting director module 208 of the ADP analytics server computing device 104 may perform ongoing health, capacity, and performance monitoring and data collection for all components across the data protection environment including the ADP data acquisition tools. In addition, the monitoring alerting reporting director module 208 may perform ongoing monitoring of events and conditions across the data protection environment. As shown in FIG. 4, this high-fidelity data collection may occur with the ADP data acquisition tools (DATs) including the data protection acquisition tool, the storage acquisition tool, the cloud acquisition tool, and the network acquisition tool.

As an example, the analytics director module 206 of the ADP analytics server computing device 104 may continually analyze at least one of metrics, events, and conditions in the data protection environment of the communications network 108. Under normal operating conditions in the communications network, the ADP analytics server computing device 104 may obtain a first level of data from at least one hardware device in the communications network 108. However, the ADP analytics server computing device 104 may detect that one of a condition and an event has occurred in the communications network 108 and may automatically transmit an instruction to modify the first level of data obtained from the at least one hardware device to a second level of data more robust than the first level of data when one of the condition and the event has occurred. By more robust, this may mean that the data is collected more often at a higher frequency of time and/or more detailed or higher fidelity data is collected. The condition and the event may comprise one of a hardware device failure, a hardware device error, and a hardware device warning, among other conditions or events such as a failure, an error, and a warning in backup server tooling software. At this point, the ADP analytics server computing device 104 may collect the second level of data from the at least one hardware device and store the second level of data obtained from the at least one hardware device. In addition, the second level of data obtained may include an increased frequency of data collection as well as an increased fidelity of data collected.

In addition, the ADP analytics server computing device 104 may automatically transmit the instruction to modify the first level of data obtained from the at least one hardware device to the second level of data to adaptive data protection data acquisition tools including at least one of a data protection acquisition tool, a storage acquisition tool, a cloud acquisition tool, and a network acquisition tool. If the ADP analytics server computing device 104 determines that the one of the condition and event has ended or is no longer occurring, the ADP analytics server computing device may transmit an instruction to revert the second level of data obtained from the at least one hardware device back to the first level of data obtained from the at least one hardware device. Alternatively, the ADP analytics server computing device 104 may only continue to collect the second level of data from the at least one hardware device for a particular period of time. In addition, the first level of data obtained may include a decreased frequency of data collection as well as a decreased fidelity of data collected.

Figure 5:
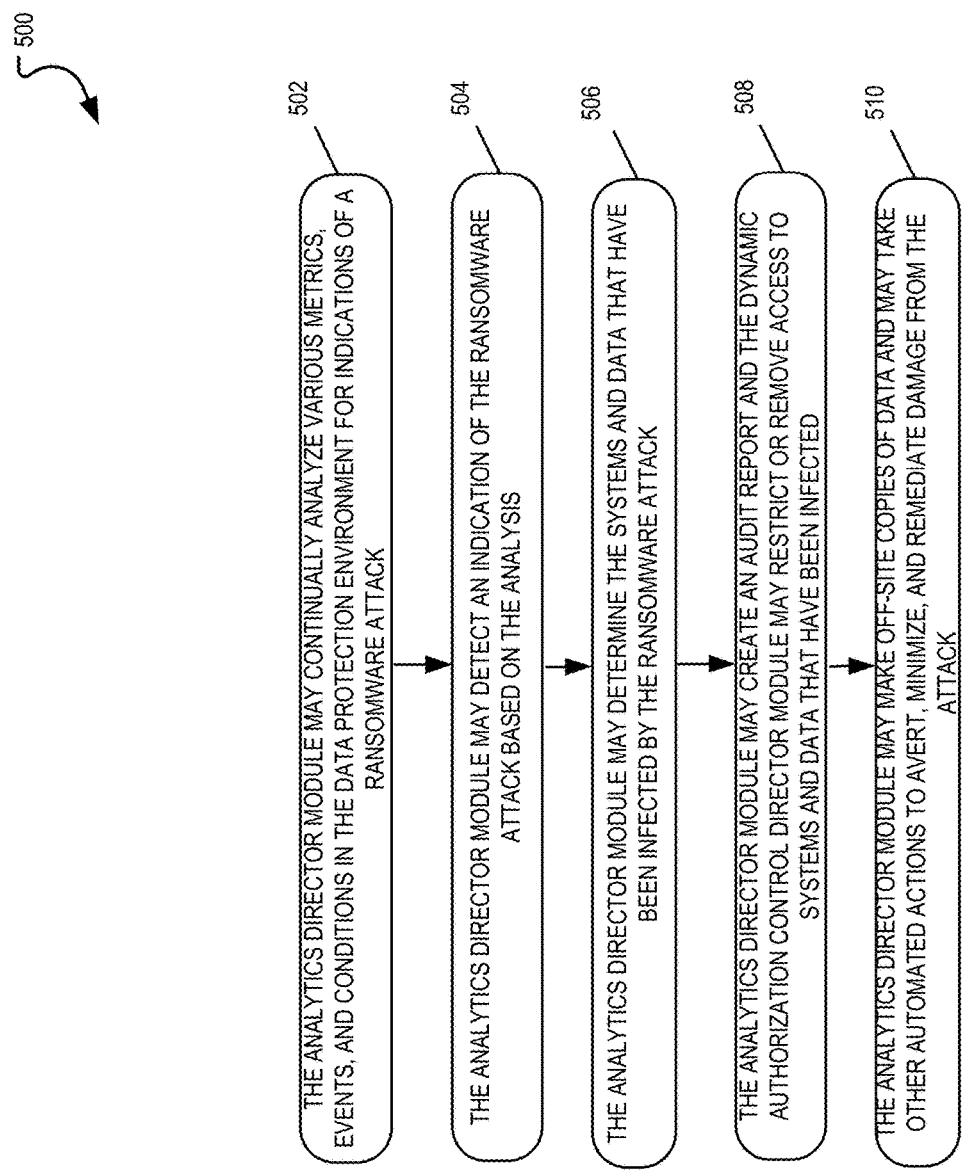
FIG. 5 illustrates a flowchart of a process for automated operational response to ransomware or cyber-attacks according to an example embodiment.

FIG. 5 illustrates a flowchart of a process 500 for automated operational response to ransomware or cyber-attacks according to an example embodiment. In a first step 502, the analytics director module 206 of the ADP analytics server computing device 104 may continually analyze various metrics, events, and conditions in the data protection environment for indications of a ransomware attack. Next, in step 504, the analytics director module 206 may detect an indication of a ransomware attack based on the analysis of the metrics, events, and conditions in the data protection environment. In step 506, the analytics director module 206 may analyze the metrics to determine the systems and data in the data protection environment that have been infected. After determining what has been infected, the analytics director module 206 may identify at least one of directories, files, databases, and data associated with the at least one hardware device that has been infected. In step 508, the analytics director module 206 may create an audit report and instruct the dynamic authorization control director module 214 to restrict or remove access to the systems and data that have been infected. In step 510, the analytics director module 206 may instruct the backup server tooling software module 312 to make off-site copies of previous versions of the data that are now infected and/or take other automated actions to avert, minimize, and remediate damage from the attack.

As an example, the ADP analytics server computing device 104 may continually analyze at least one of metrics, events, and conditions for indications of an attack in the data protection environment of the communications network 108. While in the process of continually analyzing, the ADP analytics server computing device 104 may determine a change in the at least one of metrics, events, and conditions in the communications network 108. The attack may be detected in the communications network 108 based on the change in the at least one of metrics, events, and conditions in the computer network. At this point, the ADP analytics server computing device 104 may analyze the at least one of metrics, events, and conditions in the computer network and determine that at least one hardware device has been infected. The ADP analytics server computing device 104 and/or the ADP accelerator server computing device 106 may restrict access to the at least one hardware device that has been infected. The ADP analytics server computing device 104 may generate a copy of data that was created before the attack and associated with the at least one hardware device that has been infected. Additionally, the ADP analytics server computing device 104 may transmit the copy of data that is associated with the at least one hardware device to an off-site storage device that is in a physical location different from where it is normally stored. This may include initiating data replication from backup server tooling software to the off-site location. To provide even more assurance of security, the ADP analytics server computing device 104 may not only restrict access to the at least one hardware device that has been infected but may also remove access to the at least one hardware device and may disconnect the at least one hardware device from the communications network. As noted herein, the change as determined by the ADP analytics server computing device 104 and/or the ADP accelerator server computing device 106 may be one of a change in backup deduplication rates, backup data traffic, daily backup change rates, and a number of files backed up daily per client. Other possible changes may be detected. After the changes are determined and the ADP analytics server computing device 104 determines that an attack such as a ransomware attack has occurred, the ADP analytics server computing device 104 and/or the ADP accelerator server computing device 106 may create an audit report that indicates infected systems, devices, directories, files, databases, and data and transmit the audit report to an authorized administrator having a particular authorized computing device that may be one of the client computing devices 102.

Figure 6:
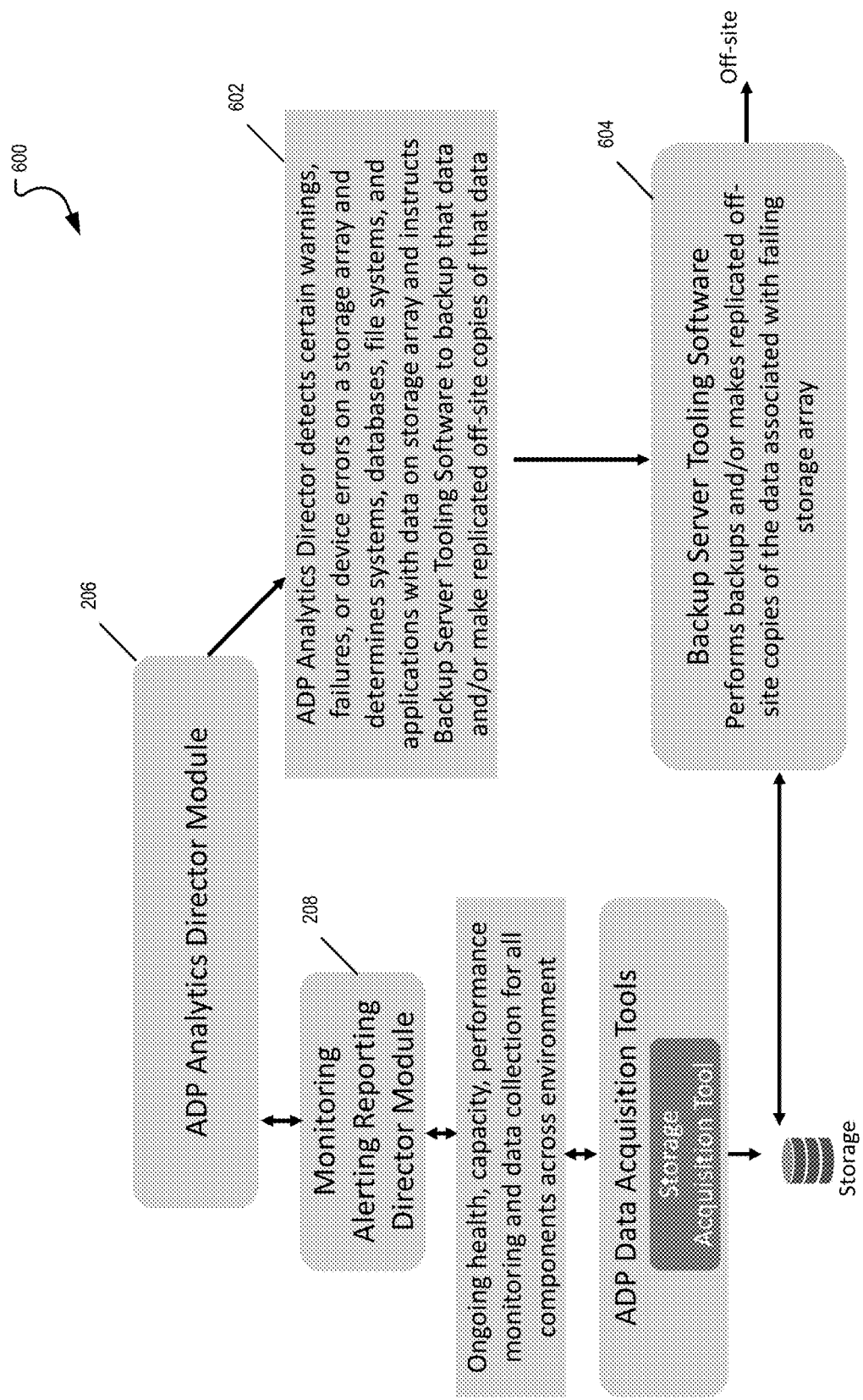
FIG. 6 illustrates a flowchart of a process for automated data health remediation according to an example embodiment.

FIG. 6 illustrates a flowchart of a process 600 for automated data health remediation according to an example embodiment. In a first step 602, the analytics director module 206 of the ADP analytics server computing device 104 may detect certain warnings, failures, or device errors on a storage array and may determine systems, databases, file systems, and applications with data on the storage array. The analytics director module 206 may then instruct the backup server tooling software to back up the data and/or make replicated off-site copies of the data. In a next step 604, the backup server tooling software may perform backups and/or may make the replicated off-site backups of the data associated with the failing storage array. As shown in FIG. 6, the monitoring alerting reporting director module 208 may perform ongoing health, capacity, and performance monitoring and data collection for all components across the data protection environment including the ADP data acquisition tools.

FIG. 7 illustrates an example of a data custody policy 700 of the system 100 according to an example embodiment. As shown in FIG. 7, the data custody policy may include one or more associated variables including a GDPR data custody role or other governing compliance requirements, a business project name, a business project priority, data retention requirements, a data encryption level, data access controls, a data resiliency level, data locality allowed, network throughput level, a network traffic rate, and a network traffic rate increment. The GDPR data custody role may be a subject, a controller, a processor, or a DPO (data protection officer). The business project name may be a name of the project that data is associated with. The business project priority may be a priority level of the project. The data retention requirements may be a data retention period or a service level that includes a retention period. The data encryption level may be encryption requirements for associated data. The data access controls may be security access roles. The data resiliency level may be a number of copies that may be required and/or may be a requirement for multi-site copies. The data locality allowed may be where data may be allowed within regions. The network throughput level may be a network utilization level that may be allowed. The network traffic rate may be a specific network traffic rate to be used for a particular condition or event. The network traffic rate increment may be a specific network traffic increment to use for a specific condition or event. Other variables and conditions may be associated with the data custody policy and those shown in FIG. 7 are examples.

Figure 8:
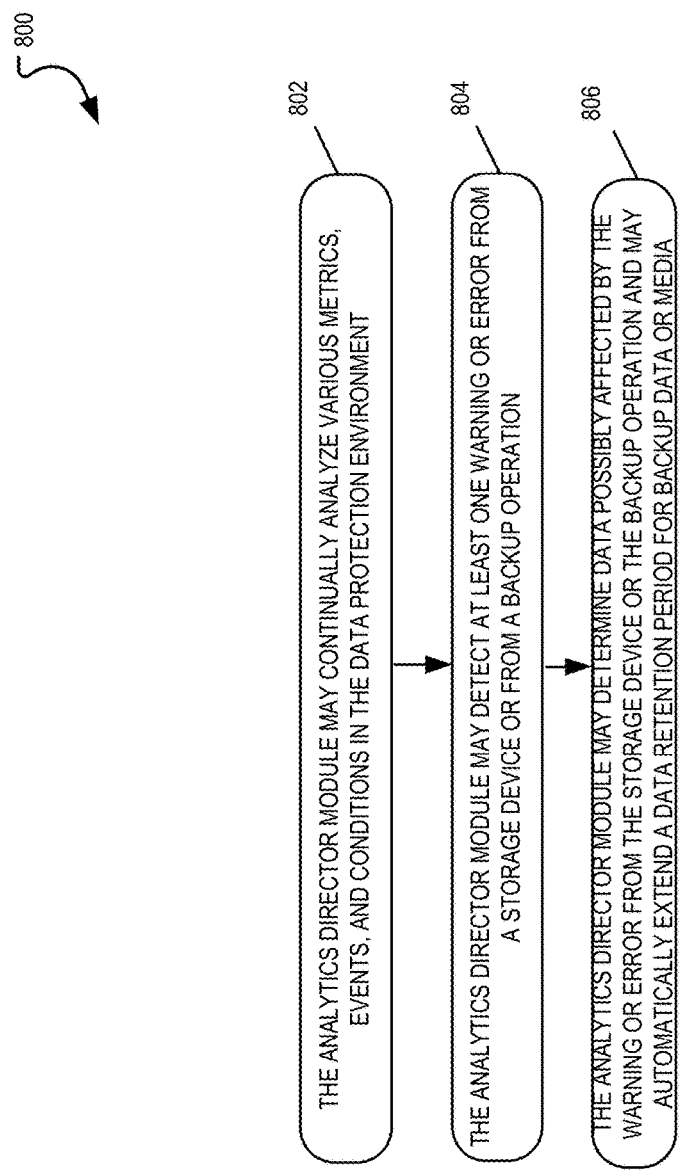
FIG. 8 illustrates a flowchart of a process for optimizing data protection infrastructure and operations using automated best practices according to an example embodiment.

FIG. 8 illustrates a flowchart of a process 800 for optimizing data protection infrastructure and operations using automated best practices according to an example embodiment. In a first step 802, the analytics director module 206 of the ADP analytics server computing device 104 may continually analyze various metrics, events, and conditions in the data protection environment. In a next step 804, the analytics director module 206 may detect at least one warning or error from storage devices or from backup operations. In step 806, the analytics director module 206 may determine data possibly affected by the warnings or errors from the storage devices or backup operations and may automatically extend a data retention period for backup data or media for data associated with the warnings or errors.

Figure 9:
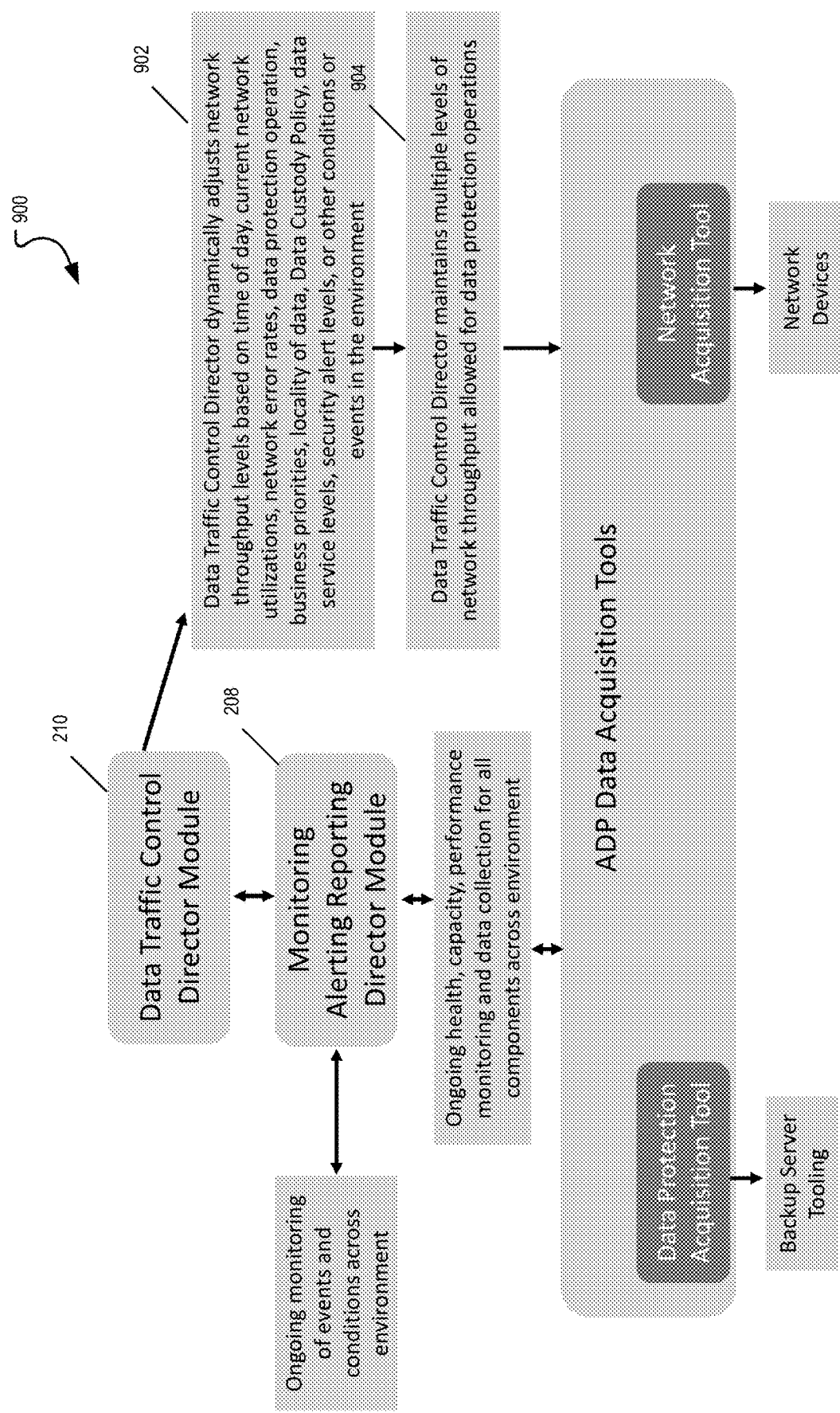
FIG. 9 illustrates a flowchart of a process for automated network traffic shaping for data protection operations according to an example embodiment.

FIG. 9 illustrates a flowchart of a process 900 for automated network traffic shaping for data protection operations according to an example embodiment. In a first step 902, the data traffic control director 210 of the ADP analytics server computing device 104 may dynamically adjust network throughput levels based on at least one of a time of day, current network utilizations, network error rates, data protection operations, business priorities, locality of data, a data custody policy, a data service level, a security alert level, or another condition or event in the data protection environment. Next, in step 904, the data traffic control director 210 may maintain and allow multiple levels of network throughput for data protection operations. The monitoring alerting reporting director module 208 of the ADP analytics server computing device 104 may perform ongoing health, capacity, and performance monitoring and data collection for all components across the data protection environment including the ADP data acquisition tools. In addition, the monitoring alerting reporting director module 208 may perform on going monitoring of events and conditions across the data protection environment.

A network throughput level may be used to control the amount of network traffic bandwidth allowed for a data protection operation in the environment. A network throughput level may be any specified bandwidth rate of throughput capacity allowed per time period (e.g., megabytes allowed per second), or a network throughput level could be defined in some other manner. A network throughput level may be statically or dynamically assigned to systems, users, groups, applications, business projects, and data protection operations, among others. A network throughput level is specified in a network throughput level setting.

The data traffic control director 210 of the ADP analytics server computing device 104 may control whether or not to allow a data protection operation (e.g., backup, restore, replication, metadata exchange, etc.) to continue or whether to allow the data protection operation to continue at a reduced or increased network traffic rate based on an analysis of metrics, conditions, and events in the environment. The result of the analysis of metrics, conditions, and events in the environment may be specified in a network throughput level setting for the data protection operation. At the time of a data protection operation, the data traffic control director 210 of the ADP analytics server computing device 104 may determine if the amount of data to be transferred in the data protection operation will exceed the currently assigned network throughput levels and if so, determine further whether to allow the data protection operation to continue. Alternatively, the data protection operation could be allowed to continue at a reduced or increased network traffic rate based on the currently specified network throughput level setting.

Figure 10:
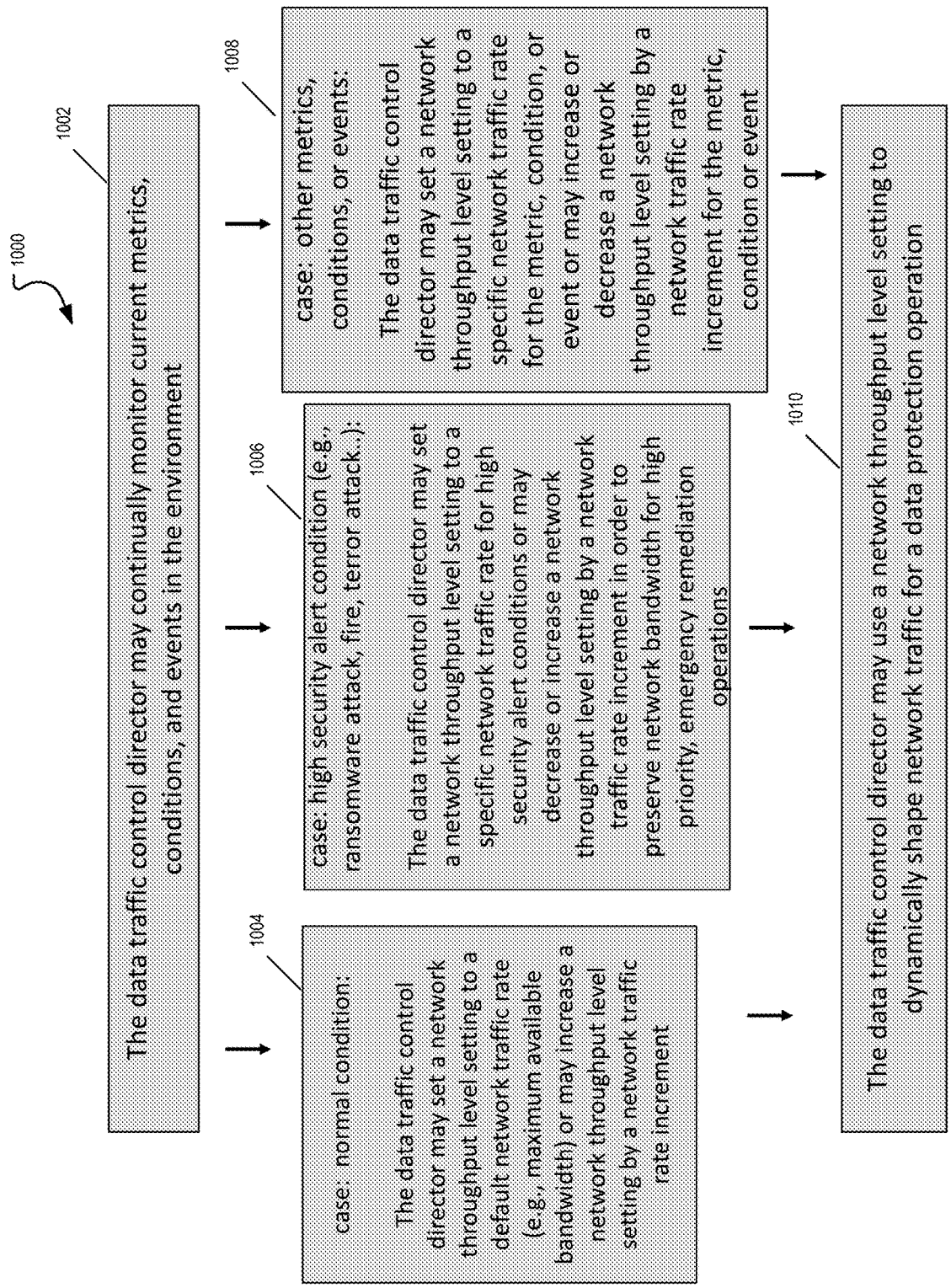
FIG. 10 illustrates a flowchart of a process for automated network traffic shaping responsive to current metrics, conditions, and events according to an example embodiment.

A network throughput level setting may be set to a specific network traffic rate based on a certain metric, condition, or event in the data protection environment. Process 1000 is shown in FIG. 10. As shown in FIG. 10, in step 1002, the data traffic control director may continually monitor current metrics, conditions, and events in the environment. For example, in step 1004, a network throughput level setting may be set to a default network traffic rate that may be defined as the maximum available bandwidth. A specific network traffic rate may be assigned for a certain metric, condition, or event and may be defined in a data custody policy or in a data service level policy or in a special network traffic shaping policy. In addition, a network throughput level setting may be dynamically adjusted by increasing or decreasing its network traffic rate by some predefined network traffic rate increment. A specific network traffic rate increment may be assigned for a certain metric, condition, or event and may be defined in a data custody policy or in a data service level policy or in a special network traffic shaping policy.

As an example, in step 1006, the data traffic control director 210 of the ADP analytics server computing device 104 may determine there is a high security alert condition such as a ransomware attack, a fire, or a terror attack and may dynamically adjust a network throughput level setting for a data protection operation to a specific decreased network traffic rate for high security alert conditions (e.g., one megabyte per second). Alternatively, the data traffic control director 210 may decrease a network throughput level setting by a network traffic rate increment or may increase a network throughput level setting by a network traffic rate increment for a high priority operation in order to preserve network bandwidth for high priority operations associated with resolving the high security threat and/or performing emergency remediation operations. Likewise, in step 1008, the data traffic control director 210 may adjust a network throughput level setting for a data protection operation to a specific network traffic rate or may increase or decrease a network throughput level setting by a network traffic rate increment for other metrics, conditions, or events in the environment. Thus, as shown in step 1010, according to an example embodiment, the data traffic control director may use a network throughput level setting to dynamically shape network traffic for a data protection operation.

Figure 11:
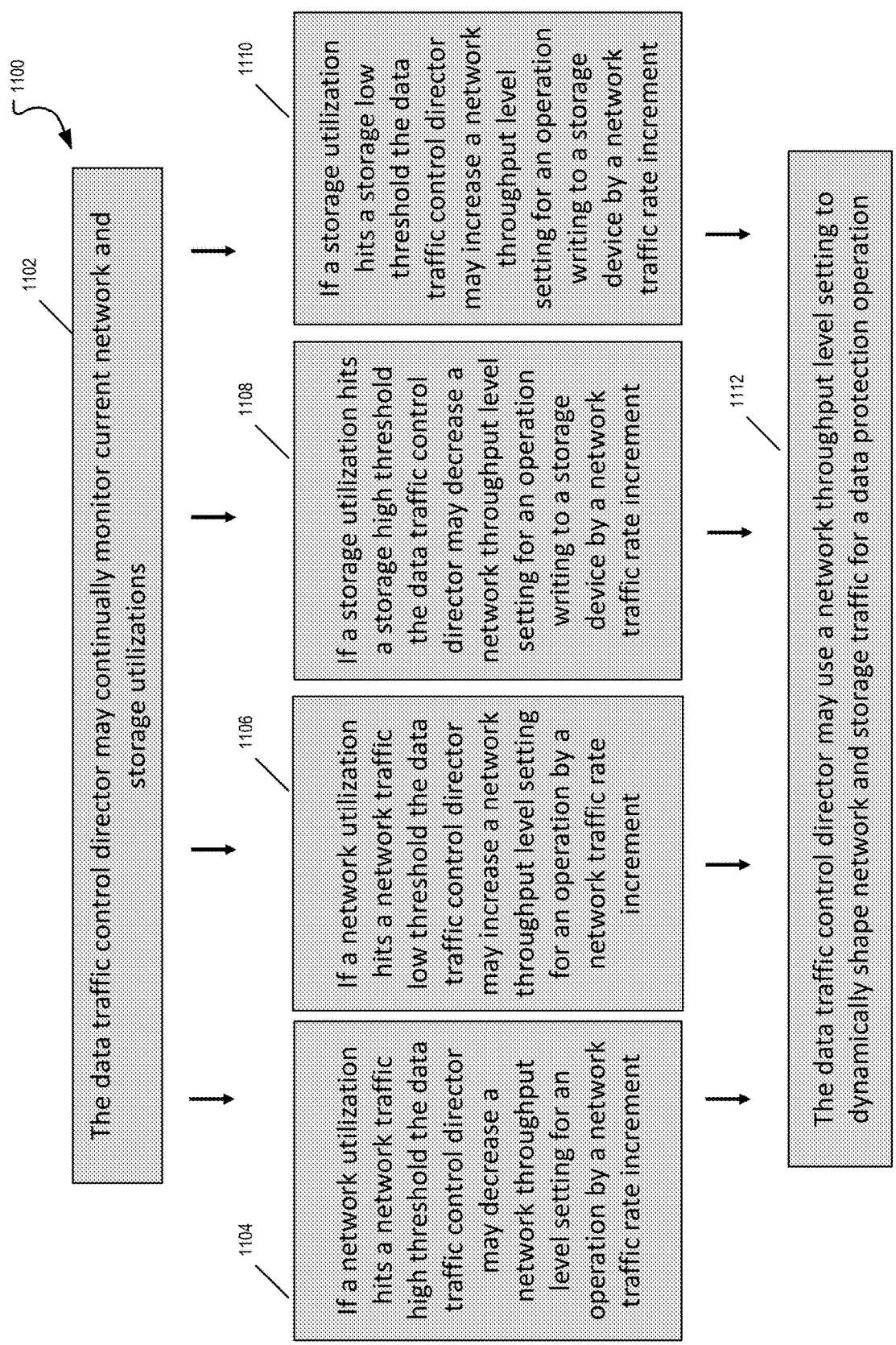
FIG. 11 illustrates a flowchart of a process for automated network and storage traffic shaping responsive to current network and storage utilization according to an example embodiment.

Process 1100 is shown in FIG. 11. In another example, as shown in FIG. 11, in step 1102, the data traffic control director 210 of the ADP analytics server computing device 104 may continually monitor current network and storage utilization metrics. In step 1104, as a network utilization metric increases and hits a network traffic high threshold, the data traffic control director 210 of the ADP analytics server computing device 104 may dynamically lower a network throughput level setting for a data protection operation by a network traffic rate increment in order to slow down operations on the highly utilized network. Alternatively, in step 1106, as a network utilization metric decreases and hits a network traffic low threshold and more network bandwidth becomes available, the data traffic control director 210 of the ADP analytics server computing device 104 may dynamically increase a network throughput level setting for a data protection operation by a network traffic rate increment in order to speed up an operation on the lesser utilized network. Likewise, in steps 1108 and 1110, the data traffic control director 210 of the ADP analytics server computing device 104 may dynamically decrease or increase a network throughput level setting for a data protection operation writing to a storage device based on storage utilization metrics in order to shape storage utilization rates. Thus, as shown in step 1112, the data traffic control director 210 may use a network throughput level setting to dynamically shape network and storage traffic for a data protection operation.

In another technique, the data traffic control director 210 of the ADP analytics server computing device 104 may auto-tune operations and network traffic for maximum utilization. In this technique, a network throughput level setting may be set for a data protection operation. If the operation is not able to sustain the network throughput level setting, the data traffic control director 210 of the ADP analytics server computing device 104 may reduce the setting until the data protection operation can sustain the network throughput level setting. Alternatively, if the operation is consistently able to fully utilize the network throughput level setting, the data traffic control director 210 of the ADP analytics server computing device 104 may increase the setting until contention for the network bandwidth is detected. This technique enables maximum utilization of the network while minimizing network contention.

In this manner, network traffic and storage utilization are dynamically shaped for data protection operations allowing optimal usage of network bandwidth and storage utilization based on system and data policy priorities.

The data traffic control director 210 of the ADP analytics server computing device 104 may perform analysis and dynamically adjust network throughput levels assigned to systems, users, groups, applications, business projects, data protection operations, or others. Analysis and adjustments of a network throughput level may be based on time of day (e.g., a network throughput level for backup operations may be reduced during normal business hours and increased to different, higher network throughput levels at different off-hour shifts throughout the evening and night), current network utilizations (e.g., a network throughput level for backup operations may be reduced if current network utilization rates are high and may be increased if current network utilization rates are low), server or storage or operational resource utilization levels (e.g., a network throughput level may be reduced for backup operations to slow down backup operations if a storage utilization is too high), network error rates (e.g., network throughput levels may be decreased upon detection of network errors), data protection operations (e.g., during a period of high network or resource utilization, network throughput levels may be increased for backup operations but decreased for replication or other disaster recovery (DR) operations to allow backup operations but to slow down or to not allow DR operations during high network or resource utilization), business priorities (e.g., a high priority business project such as an audit or data center migration may have operations associated with the high priority business project assigned higher network throughput levels), locality of data (e.g., data operations involving data being transferred to or from the cloud may have higher or lower network throughput levels assigned based on business needs), a data custody policy, a data service level, a security alert level (e.g., a high security alert level may result in decreasing a network throughput level to minimize data security exposures), or based on another metric, condition, or event in the data protection environment.

A network throughput level may be enforced leveraging one or more of a number of techniques available in network devices, network adapters, operating systems, or others.

The system 100 may automatically remediate data protection operations by enabling/disabling, activating/deactivating, or turning on or off the automatic prioritization of data protection operations across the environment based upon detection of certain events or conditions in the environment. As an example, under normal operating conditions the analytics director module 206 of the ADP analytics server computing device 104 may deactivate or turn automatic prioritization of data protection operations off across the environment. The ADP analytics server computing device 104 may continually monitor and analyze at least one of metrics, events, or conditions to determine if automatic prioritization of data protection operations should be enabled, activated, or turned on to help remediate operational contentions to business project priorities. As an example, analysis of system, storage, network, and data protection infrastructure utilization metrics may indicate operational contention and the need to enable, activate, or turn on automatic prioritization of data protection operations. As another example, conditions such as a high security alert or severe weather or events such as a flood, fire, or ransomware attack or another event may indicate a need to only prioritize operations that are critical to the system 100 as specified in a data custody policy. In such conditions or events, the analytics director module 206 of the ADP analytics server computing device 104 may enable, activate, or turn on automatic prioritization of data protection operations across the environment to ensure critical system operations are given priority under conditions or events of duress.

Figure 12:
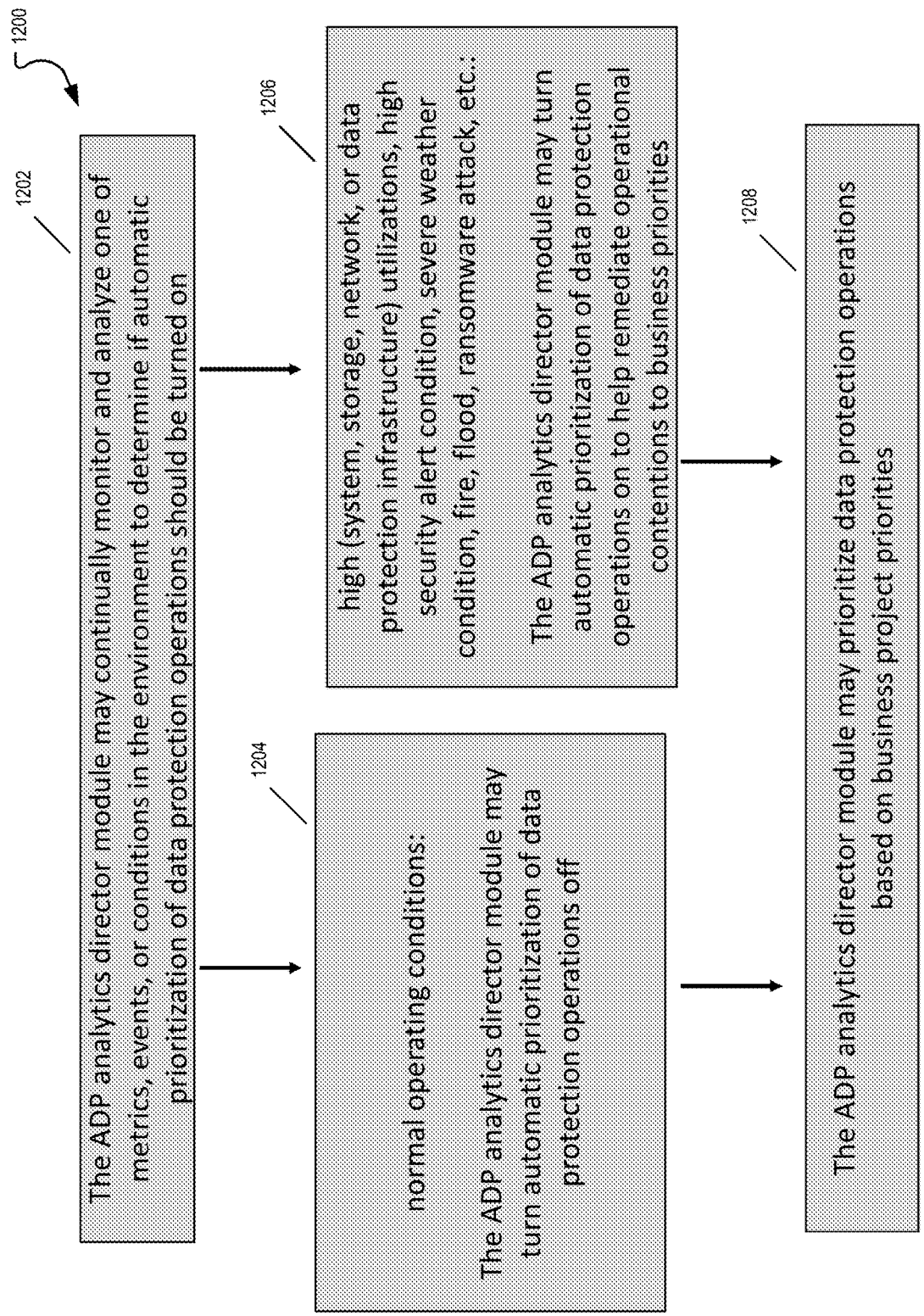
FIG. 12 illustrates a flowchart of a process for automated remediation of data protection operations according to an example embodiment.

FIG. 12 shows a process 1200 for automated remediation of data protection operations according to an example embodiment. In step 1202, the ADP analytics director module 206 of the ADP analytics server computing device 104 may continually monitor and analyze one of metrics, events, and conditions in the environment to determine whether to enable, activate, or turn on automatic prioritization of data protection operations. As shown in step 1204, if there are normal operating conditions, then the ADP analytics director module 206 may disable, deactivate, or turn off the automatic prioritization of data protection operations. In step 1206, if there are not normal operating conditions, then the ADP analytics director module 206 may enable, activate, or turn on automatic prioritization of data protection operations to help remediate operational contentions to system priorities. As an example, there may be high utilization of the system, storage, network, or data protection infrastructure. Alternatively, there may be a high security alert condition, a severe weather alert condition, a fire, a flood, or a ransomware attack, among other issues. In step 1208, the ADP analytics director module 206 may prioritize data protection operations based on system priorities.

Figure 13:
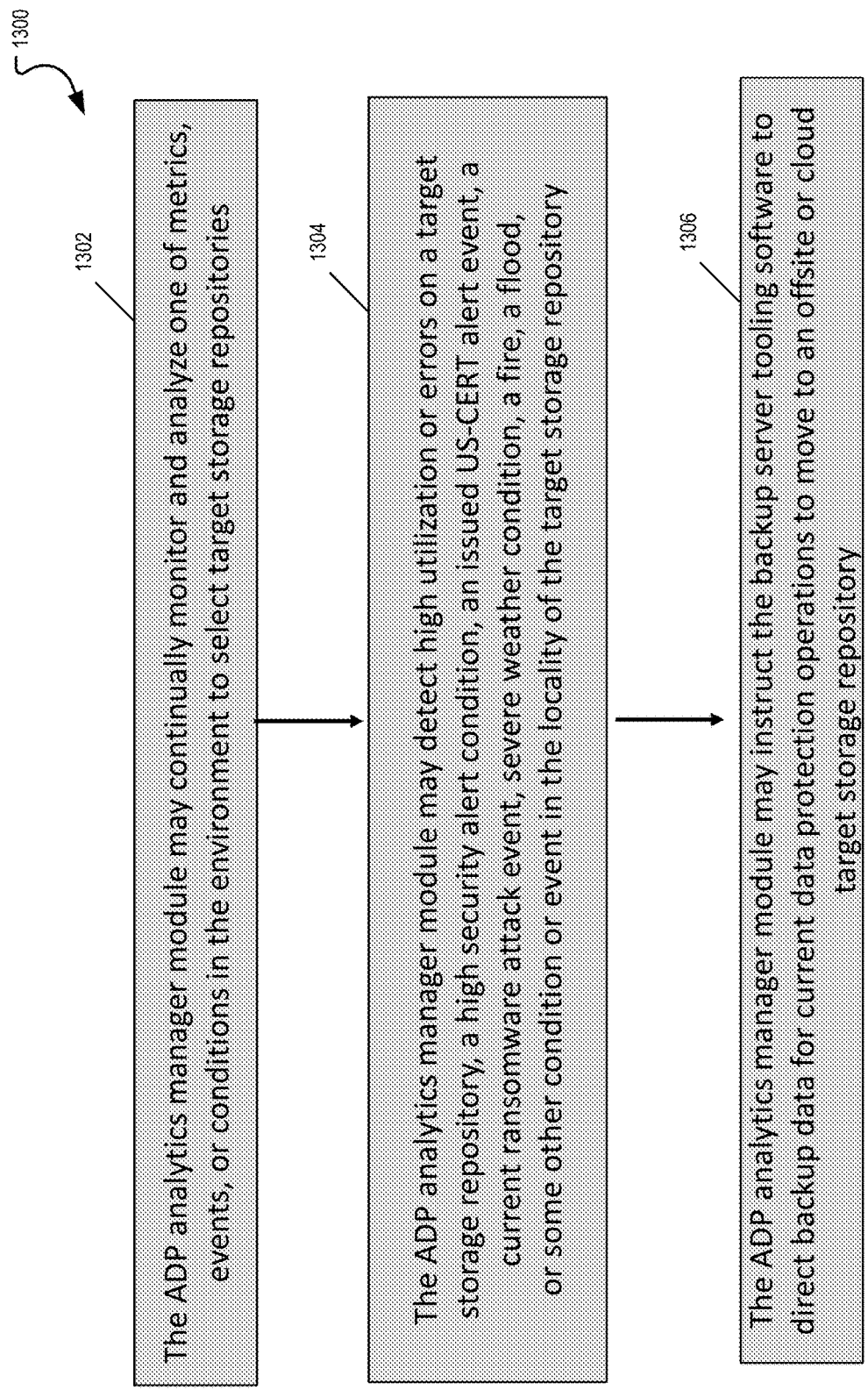
FIG. 13 illustrates a flowchart of a process for dynamic selection of a target storage repository according to an example embodiment.

FIG. 13 shows a process 1300 for dynamic selection of a target storage repository based on failing devices, ransomware attacks, and other conditions or events according to an example embodiment. In step 1302, the ADP analytics manager module 306 of the ADP accelerator server computing device 106 may continually monitor and analyze one of metrics, events, and conditions, in the environment to select target storage repositories. In step 1304, the ADP analytics manager module 306 may detect high utilization or errors on a target storage repository, a high security alert condition, an issued US-CERT alert event, a current ransomware attack event, a severe weather condition, a fire, a flood, or some other condition or event in the locality of the target storage repository. As an example, this may mean that the severe weather condition, the fire, or the flood may be affecting the target storage repository or may possibly affect the target storage repository. In step 1306, the ADP analytics manager module 306 may instruct the backup server tooling software to direct backup data for current data protection operations to move to an offsite or cloud or other target storage repository.

Figure 14:
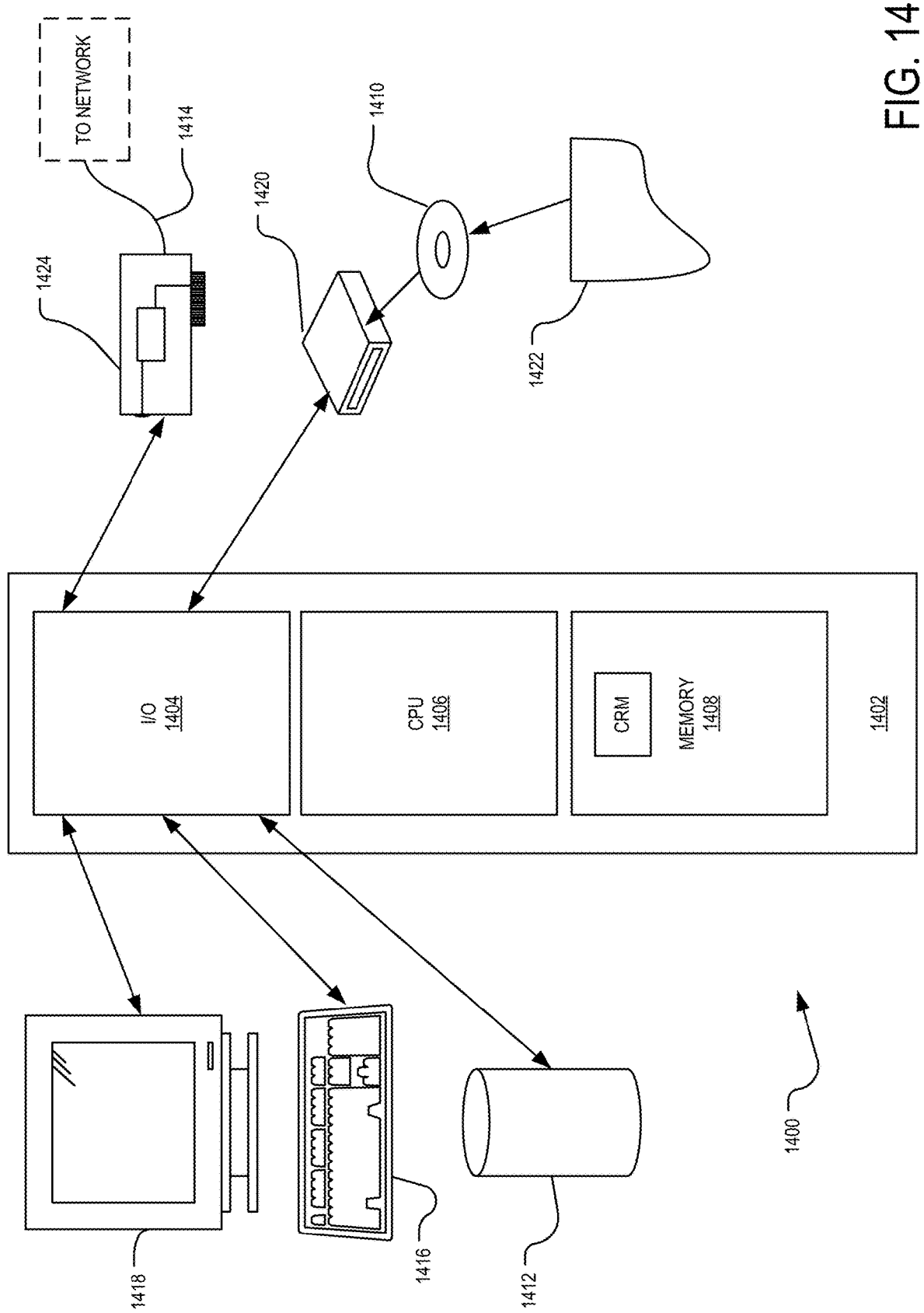
FIG. 14 illustrates a block diagram of an example computer device for use with the example embodiments.

FIG. 14 illustrates an example computing system 1400 that may implement various systems, such as the client computing device 102, the ADP analytics server computing device 104, the ADP accelerator server computing device 106, and the methods discussed herein, such as process 400, process 500, process 600, process 800, process 900, process 1000, process 1100, process 1200, and process 1300. A general-purpose computer system 1400 is capable of executing a computer program product to execute a computer process. Data and program files may be input to the computer system 1400, which reads the files and executes the programs therein such as the ADP analytics director application 110A and the ADP analytics manager application 110B. Some of the elements of a general purpose computer system 1400 are shown in FIG. 14 wherein a processor 1402 is shown having an input/output (I/O) section 1404, a central processing unit (CPU) 1406, and a memory section 1408. There may be one or more processors 1402, such that the processor 1402 of the computer system 1400 comprises a single central-processing unit 1406, or a plurality of processing units, commonly referred to as a parallel processing environment. The computer system 1400 may be a conventional computer, a server, a distributed computer, or any other type of computer, such as one or more external computers made available via a cloud computing architecture. The presently described technology is optionally implemented in software devices loaded in memory 1408, stored on a configured DVD/CD-ROM 1410 or storage unit 1412, and/or communicated via a wired or wireless network link 1414, thereby transforming the computer system 1400 in FIG. 14 to a special purpose machine for implementing the described operations.

The memory section 1408 may be volatile media, non-volatile media, removable media, non-removable media, and/or other media or mediums that can be accessed by a general purpose or special purpose computing device. For example, the memory section 1408 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1404 is connected to one or more user-interface devices (e.g., a keyboard 1416 and a display unit 1418), a disc storage unit 1412, and a disc drive unit 1420. Generally, the disc drive unit 1420 is a DVD/CD-ROM drive unit capable of reading the DVD/CD-ROM medium 1410, which typically contains programs and data 1422. Computer program products containing mechanisms to effectuate the systems and methods in accordance with the presently described technology may reside in the memory section 1408, on a disc storage unit 1412, on the DVD/CD-ROM medium 1410 of the computer system 1400, or on external storage devices made available via a cloud computing architecture with such computer program products, including one or more database management products, web server products, application server products, and/or other additional software components. Alternatively, a disc drive unit 1420 may be replaced or supplemented by a floppy drive unit, a tape drive unit, or other storage medium drive unit. The network adapter 1424 is capable of connecting the computer system 1400 to a network via the network link 1414, through which the computer system can receive instructions and data. Examples of such systems include personal computers, Intel or PowerPC-based computing systems, AMD-based computing systems, ARM-based computing systems, and other systems running a WINDOWS-based, a UNIX-based, a LINUX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1400 is connected (by wired connection and/or wirelessly) to a local network through the network interface or adapter 1424, which is one type of communications device. When used in a WAN-networking environment, the computer system 1400 typically includes a modem, a network adapter, or any other type of communications device for establishing communications over the wide area network. In a networked environment, program modules depicted relative to the computer system 1400 or portions thereof, may be stored in a remote memory storage device. It is appreciated that the network connections shown are examples of communications devices for and other means of establishing a communications link between the computers may be used.

In an example implementation, source code executed by the client computing device 102, the ADP analytics server computing device 104, the ADP accelerator server computing device 106, a plurality of internal and external databases, source databases, and/or cached data on servers are stored in the storage of ADP accelerator, memory of the client computing device 102, memory of the ADP analytics server computing device 104, memory of ADP accelerator server computing device, or other storage systems, such as the disk storage unit 1412 or the DVD/CD-ROM medium 1410, and/or other external storage devices made available and accessible via a network architecture. The source code executed by the client computing device 102, the ADP analytics server computing device 104, and the ADP accelerator server computing device 106 may be embodied by instructions stored on such storage systems and executed by the processor 1402.

Some or all of the operations described herein may be performed by the processor 1402, which is hardware. Further, local computing systems, remote data sources and/or services, and other associated logic represent firmware, hardware, and/or software configured to control operations of the data protection automatic optimization system 100 and/or other components. Such services may be implemented using a general-purpose computer and specialized software (such as a server executing service software), a special purpose computing system and specialized software (such as a mobile device or network appliance executing service software), or other computing configurations. In addition, one or more functionalities disclosed herein may be generated by the processor 1402 and a user may interact with a Graphical User Interface (GUI) using one or more user-interface devices (e.g., the keyboard 1416, the display unit 1418, and the user devices 1404) with some of the data in use directly coming from online sources and data stores. The system set forth in FIG. 14 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
a memory; and
at least one processor to:
    set a network throughput level setting to a default network traffic rate in a computer network;
    begin a data protection operation at the network throughput level setting in the computer network;
    continually monitor the computer network and determine that a high security alert has occurred in the computer network;
    dynamically adjust the network throughput level setting in response to the high security alert by increasing or decreasing the network throughput level setting by a predefined network traffic rate increment assigned to the high security alert, wherein the predefined network traffic rate increment is assigned to the high security alert in one of a data custody policy, a data service level policy, and a special network traffic shaping policy; and
    dynamically adjust network or storage traffic for the data protection operation using the network throughput level setting.

2. The system of claim 1, wherein the data protection operation comprises one of a backup operation, a restore operation, an archive operation, a long-term data retention operation, a replication operation, and a metadata exchange operation.

3. The system of claim 1, the at least one processor further to set the network throughput level setting to a maximum available bandwidth.

4. The system of claim 1, the at least one processor further to:
continually monitor a network utilization of the computer network and storage utilization in the computer network and perform at least one of:
    determine that the network utilization is greater than a network traffic threshold and decrease the network throughput level setting for the data protection operation;
    determine that the network utilization is less than the network traffic threshold and increase the network throughput level setting for the data protection operation;
    determine that the data protection operation is not able to sustain the network throughput level setting and decrease the network throughput level setting for the data protection operation;
    determine that the data protection operation is able to sustain the network throughput level setting and increase the network throughput level setting for the data protection operation;
    determine that the storage utilization is greater than a storage threshold and decrease the network throughput level setting for the data protection operation writing to a storage device; and
    determine that storage utilization is less than the storage threshold and increase the network throughput level setting for the data protection operation writing to the storage device.

5. A method comprising:
- setting, by at least one processor, a network throughput level setting to a default network traffic rate in a computer network;
- beginning, by the at least one processor, a data protection operation at the network throughput level setting in the computer network;
- continually monitoring, by the at least one processor, the computer network and determining that a high security alert has occurred in the computer network;
- dynamically adjusting, by the at least one processor, the network throughput level setting in response to the high security alert by at least one of increasing or decreasing the network throughput level setting by a predefined network traffic rate increment assigned to the high security alert, wherein the predefined network traffic rate increment for the high security alert is defined in one of a data custody policy, a data service level policy, and a special network traffic shaping policy; and
- dynamically adjusting, by the at least one processor, network or storage traffic for the data protection operation using the network throughput level setting.

6. The method of claim 5, wherein the data protection operation comprises one of a backup operation, a restore operation, an archive operation, a long-term data retention operation, a replication operation, and a metadata exchange operation.

7. The method of claim 5, further comprising setting the network throughput level setting to a maximum available bandwidth.

8. The method of claim 5, further comprising:
- continually monitoring a network utilization of the computer network and storage utilization in the computer network and performing at least one of:
  - determining that the network utilization is greater than a network traffic threshold and decreasing the network throughput level setting for the data protection operation;
  - determining that the network utilization is less than the network traffic threshold and increasing the network throughput level setting forth data protection operation;
  - determining that the data protection operation is not able to sustain the network throughput level setting and decreasing the network throughput level setting for the data protection operation;
  - determining that the data protection operation is able to sustain the network throughput level setting and increasing the network throughput level setting for the data protection operation;
  - determining that the storage utilization is greater than a storage threshold and decreasing the network throughput level setting for the data protection operation writing to a storage device; and
  - determining that storage utilization is less than the storage threshold and increasing the network throughput level setting for the data protection operation writing to the storage device.

9. A non-transitory computer-readable storage medium, having instructions stored thereon that, when executed by a computing device, cause the computing device to perform operations, the operations comprising:
- setting a network throughput level setting to a default network traffic rate in a computer network;
- beginning a data protection operation at the network throughput level setting in the computer network;
- continually monitoring the computer network and determining that a high security alert has occurred in the computer network;
- dynamically adjusting the network throughput level setting in response to the high security by increasing or decreasing the network throughput level setting by a predefined network traffic rate increment assigned to the high security alert, wherein the predefined network traffic rate increment for the high security alert is defined in one of a data custody policy, a data service level policy, and a special network traffic shaping policy; and
- dynamically adjusting network or storage traffic for the data protection operation using the network throughput level setting.

10. The non-transitory computer-readable storage medium of claim 9, wherein the data protection operation comprises one of a backup operation, a restore operation, an archive operation, a long-term data retention operation, a replication operation, and a metadata exchange operation.

11. The non-transitory computer-readable storage medium of claim 9, the operations further comprising setting the network throughput level setting to a maximum available bandwidth.

12. The non-transitory computer-readable storage medium of claim 9, the operations further comprising:
- continually monitoring a network utilization of the computer network and storage utilization in the computer network and performing at least one of:
  - determining that the network utilization is greater than a network traffic threshold and decreasing the network throughput level setting for the data protection operation;
  - determining that the network utilization is less than the network traffic threshold and increasing the network throughput level setting forth data protection operation;
  - determining that the data protection operation is not able to sustain the network throughput level setting and decreasing the network throughput level setting for the data protection operation;
  - determining that the data protection operation is able to sustain the network throughput level setting and increasing the network throughput level setting for the data protection operation;
  - determining that the storage utilization is greater than a storage threshold and decreasing the network throughput level setting for the data protection operation writing to a storage device; and
  - determining that storage utilization is less than the storage threshold and increasing the network throughput level setting for the data protection operation writing to the storage device.

* * * * *